US008238820B2

(12) United States Patent
Park et al.

(10) Patent No.: US 8,238,820 B2
(45) Date of Patent: Aug. 7, 2012

(54) ON-CHANNEL REPEATER AND ON-CHANNEL REPEATING METHOD

(75) Inventors: Sung-Ik Park, Daejon (KR); Heung-Mook Kim, Daejon (KR); Jae-Young Lee, Seoul (KR); Jae-Hyun Seo, Daejon (KR); Ho-Min Eum, Daejon (KR); Yong-Tae Lee, Daejon (KR); Jong-Soo Lim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 356 days.

(21) Appl. No.: 12/507,115

(22) Filed: Jul. 22, 2009

(65) Prior Publication Data

US 2009/0286473 A1 Nov. 19, 2009

Related U.S. Application Data

(63) Continuation-in-part of application No. PCT/KR2007/005647, filed on Nov. 9, 2007.

(30) Foreign Application Priority Data

May 9, 2007 (KR) .................. 10-2007-0045234

(51) Int. Cl.
*H04B 7/14* (2006.01)

(52) U.S. Cl. .................. 455/24; 455/13.3; 455/14
(58) Field of Classification Search .................. 455/10, 455/13.3, 14, 20, 21, 22, 23, 24; 375/211, 375/213, 214, 321, 343, 350; 381/83, 93
See application file for complete search history.

(56) References Cited

U.S. PATENT DOCUMENTS

| | | | |
|---|---|---|---|
| 7,627,287 B2* | 12/2009 | Moss | 455/16 |
| 7,894,768 B2* | 2/2011 | Ding et al. | 455/11.1 |
| 2003/0022626 A1* | 1/2003 | Miquel et al. | 455/24 |
| 2004/0237117 A1 | 11/2004 | Park et al. | |
| 2005/0190822 A1 | 9/2005 | Fujii et al. | |
| 2006/0013183 A1 | 1/2006 | Lee et al. | |
| 2006/0264174 A1 | 11/2006 | Moss | |
| 2007/0041434 A1* | 2/2007 | Park et al. | 375/211 |

FOREIGN PATENT DOCUMENTS

| | | |
|---|---|---|
| KR | 10-0540171 B1 | 12/2004 |
| WO | 2006/115320 A1 | 11/2006 |

* cited by examiner

*Primary Examiner* — Ping Hsieh
(74) *Attorney, Agent, or Firm* — Ladas & Parry LLP

(57) ABSTRACT

Provided is an on-channel repeater, which includes a receiver for receiving radio frequency (RF) signals; a subtractor for subtracting replica from the RF signals to thereby produce output signals of the subtractor; a repeating process unit for performing a repeating process onto the output signals of the subtractor; and a replica generator for calculating replica based on the output signals of the subtractor and the signals obtained after repeating process performed thereon and feeding the replica back to the subtractor.

19 Claims, 20 Drawing Sheets

ON-CHANNEL REPEATER AND ON-CHANNEL REPEATING METHOD

TECHNICAL FIELD

The present invention relates to an on-channel repeater and an on-channel repeating method thereof; and, more particularly, to an on-channel repeater which retransmits the same signals as input signals by converting radio frequency (RF) signals received into signals of a predetermined band, subtracting replica of feedback signals from the signals of the predetermined band to thereby primarily remove feedback signals generated due to low isolation of transmission and reception antennas, and converting the signals which include the remaining feedback signals into baseband signals to thereby remove noise, multipath signals and remaining feedback signals, which are caused on a transmission channel between a main transmitter and the on-channel repeater, and an on-channel repeating method thereof.

BACKGROUND ART

Repeaters are set up in areas where signals transmitted from main transmitters are received weak to resolve instable and weak signal reception.

FIG. 1 shows a typical repeating system with repeaters using different frequencies.

Referring to FIG. 1, a main transmitter 101 transmits signals of frequency A, and repeaters 102 to 105 retransmit signals of frequencies B, C, D and E, respectively, which are different from the frequency A. In the conventional repeating system, different frequencies B, C, D and E are used for the repeaters 102 to 105, respectively. Since a plurality of frequency bands are used, the system requires many frequency resources and it is quite inefficient in the respective of frequency utility.

FIG. 2 shows another conventional repeating system which using the same frequency among repeaters.

A main transmitter 201 transmits signals of frequency A, and on-channel repeaters 202 to 205 retransmits signals through the frequency A, too. For on-channel repeaters to use the same frequency as a main transmitter, signals of the same frequency transmitted from the main transmitter 201 and the on-channel repeaters 202 to 205 should be able to be identified, individually.

If signals of the same frequency band are not the same (that is, the output signals of a repeater are different from the output signals of the main transmitter), the signals are on-channel interference signals at each repeater and they cannot be removed even with an equalizer or other devices.

Also, signals transmitted from the main transmitter and the on-channel repeaters have a time delay longer than a predetermined reference value, an equalizer cannot remove the delayed signals. Therefore, for on-channel repeating, the output signals of an on-channel repeater should be the same as the output signals of the main transmitter and the time delay between the output signals of the two parts should be short.

Shortcomings of the conventional repeaters will be described hereafter with reference to FIGS. 3 to 7.

FIG. 3 shows a typical RF amplifying on-channel repeater. Referring to FIG. 3, a reception antenna 301 and an RF receiver 302 receive RF signals transmitted from a main transmitter, and an RF band pass filter 303 passes through only signals of a predetermined band among the received RF signals. A high-power amplifier 304 amplifies the RF signals that have passed through the band, and the amplified RF signals are transmitted into on-channel through a transmission antenna 305.

FIG. 4 illustrates a conventional IF converting on-channel repeater. Referring to FIG. 4, a reception antenna 401 and an RF receiver 402 receive RF signals transmitted from a main transmitter, and an intermediate frequency (IF) down-converter 403 converts the received RF signals into IF signals based on a reference frequency supplied from a local oscillator (LO) 408. An IF band pass filter 404 passes through signals of a predetermined band among the IF signals, and an RF up-converter 405 converts the IF signals of the predetermined band that have passed through the band into RF signals based on a reference frequency supplied from the local oscillator 408. A high-power amplifier 406 amplifies the RF signals, which are transmitted out through a transmission antenna 407.

FIG. 5 illustrates a conventional on-channel repeater employing a Surface Acoustic Wave (SAW) filter. Referring to FIG. 5, a reception antenna 501 and an RF receiver 502 receive RF signals transmitted from a main transmitter, and an IF down-converter 503 converts the received RF signals into IF signals based on a reference frequency supplied from a local oscillator 508. A SAW filter 504 passes through signals of a predetermined band among the IF signals, and an RF up-converter 505 converts the IF signals of the predetermined band that have passed through the band into RF signals based on a reference frequency supplied from the local oscillator 508. A high-power amplifier 506 amplifies the RF signals, which are transmitted through a transmission antenna 507.

The on-channel repeaters of FIGS. 3 to 5 have a property that the characteristics of their output signals are inferior to those of input signals, because noise and multipath signals caused on a transmission path between the main transmitter and the on-channel repeaters, feedback signals generated due to low isolation of the transmission and reception antennas, and system noise occurring in the on-channel repeater system cannot be eliminated. Also, there is another problem in that the feedback signals generated due to the low isolation of the transmission and reception antennas restrict the transmission output power of the on-channel repeaters.

FIG. 6 shows a conventional on-channel repeater executing modulation and demodulation. Referring to FIG. 6, a reception antenna 601 and an RF receiver 602 receive RF signals transmitted from a main transmitter. An IF down-converter 603 converts the received RF signals into IF signals based on a reference frequency supplied from a local oscillator 611. A demodulator 604 demodulates the IF signals into baseband signals, and an equalizing and Forward Error Correction (FEC) decoding unit 605 eliminates noise and multipath signals caused on a transmission path between a main transmitter and the on-channel repeater and feedback signals generated due to low isolation of transmission and reception antennas from the baseband signals obtained from the demodulation. An FEC encoder 606 performs error correction coding onto the output signals of the equalizing and FEC decoding unit 605. A modulator 607 converts the FEC-encoded signals into IF signals, and an RF up-converter 608 converts the IF signals into RF signals based on a reference frequency supplied from the local oscillator 611. A high-power amplifier 609 amplifies the RF signals and the amplified RF signals are transmitted through a transmission antenna 610.

The on-channel repeater shown in FIG. 6 improves the multipath and noise removing ability, which is a problem of the repeaters illustrated in FIGS. 3 to 5, by employing the equalizing and FEC decoding unit, but it increases time delay from conventional microsecond-level to millisecond-level because it includes the FEC encoder and the FEC decoding unit. Furthermore, since the feedback signals generated due to ambiguity of a standard trellis encoder of the FEC encoder is not removed, there is a problem in that the transmission output power is restricted.

FIG. 7 is a block diagram illustrating a conventional on-channel repeater employing an equalizer. Referring to FIG. 7, a reception antenna 701 and an RF receiver 702 receive RF signals transmitted from a main transmitter. An IF down-converter 703 converts the received RF signals to IF signals based on a reference frequency supplied by a local oscillator 710, and a demodulator 704 demodulates the IF signals into baseband signals. An equalizer 705 eliminates noise and multipath signals caused on a transmission path between a main transmitter and the on-channel repeater and feedback signals generated due to low isolation of transmission and reception antennas. A modulator 706 converts the baseband signals without noise, multipath signals and feedback signals into IF signals. An RF up-converter 707 converts the IF signals into RF signals based on a reference frequency supplied by the local oscillator 710. A high-power amplifier 708 amplifies the RF signals and the amplified RF signals are transmitted through a transmission antenna 709.

The on-channel repeater of FIG. 7 which employs an equalizer has a problem in that when the electric field strength of the transmitted feedback signals (which are generated due to low isolation of the transmission and reception antennas) is higher than the electric field strength of input signals inputted to the on-channel repeater, the equalizer cannot only remove feedback signals but also it makes an emission, which causes the on-channel repeater to malfunction.

Due to the limitation in the ability of removing feedback signals, which is common among conventional repeaters, the conventional on-channel repeater employing an equalizer has a low applicability and requires a great amount of investment.

Therefore, it is required to develop an on-channel repeater which outputs the same output signals as the output signals of a main transmitter, has a short time delay between the output signals of the main transmitter and the output signals of the on-channel repeater, outputs signals whose characteristics are superior to those of input signals of the on-channel repeater by eliminating noise and multipath signals caused on a transmission path between the main transmitter and the on-channel repeater, and increases transmission output power of the on-channel repeater by eliminating feedback signals generated due to low isolation of transmission and reception antennas (i.e., feedback signals having a higher electric field strength than the input signals of the on-channel repeater) to thereby improve applicability and reduce the amount of investment.

DISCLOSURE

Technical Problem

An embodiment of the present invention is directed to providing an on-channel repeater which retransmits the same signals as input signals by converting radio frequency (RF) signals received into signals of a predetermined band, subtracting replica of feedback signals from the signals of the predetermined band to thereby primarily remove feedback signals generated due to low isolation of transmission and reception antennas, and converting the signals which include the remaining feedback signals into baseband signals to thereby remove noise, multipath signals and remaining feedback signals, which are caused on a transmission channel between a main transmitter and the on-channel repeater, and an on-channel repeating method thereof.

Technical Solution

In accordance with an aspect of the present invention, there is provided an on-channel repeater, including: a receiver for receiving radio frequency (RF) signals; a subtractor for subtracting replica from output signals of the receiver to thereby produce output signals of the subtractor; a repeating process unit for performing a repeating process onto the output signals of the subtractor; and a replica generator for calculating replica based on the output signals of the subtractor and the signals obtained after repeating process performed thereon and feeding the replica back to the subtractor.

In accordance with another aspect of the present invention, there is provided an on-channel repeating method, including: receiving radio frequency (RF) signals; subtracting replica from the received RF signals to thereby produce output signals of the subtractor; performing a repeating process onto the output signals of the subtractor; and calculating the replica based on the output signals of the subtractor and the repeated signals, and feeding the replica back to said subtracting replica from the received RF signals.

ADVANTAGEOUS EFFECTS

As described above, the technology of the present invention has an effect of enhancing utility efficiency of frequency resources whose amount is limited because it outputs the same signals as output signals of a main transmitter, has a short processing time delay through the repeater, and retransmits signals whose distortion on a reception channel of the repeater is corrected.

BEST MODE FOR THE INVENTION

Figure 1:
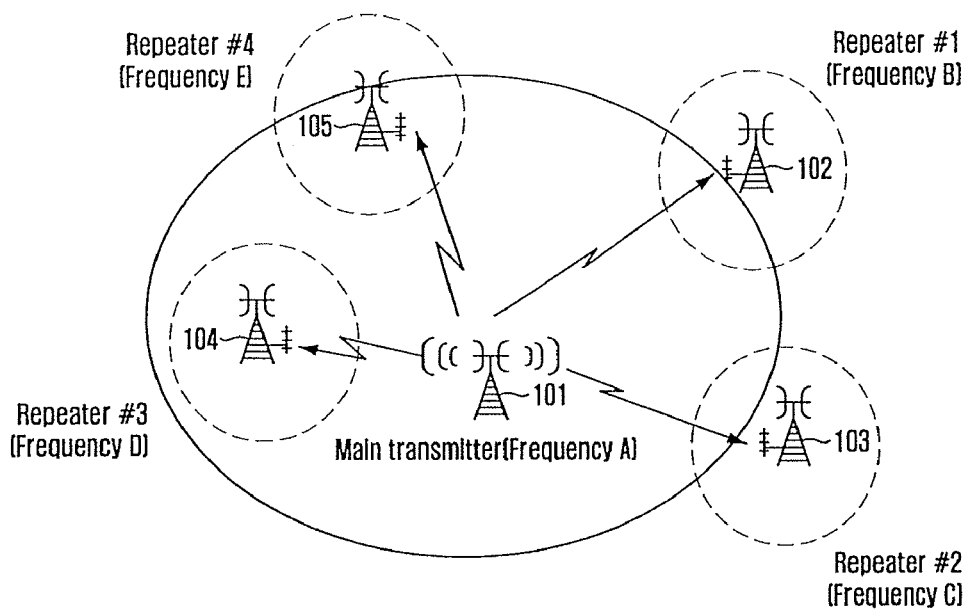
FIG. 1 shows a conventional repeating system using different frequencies among repeaters.
Figure 2:
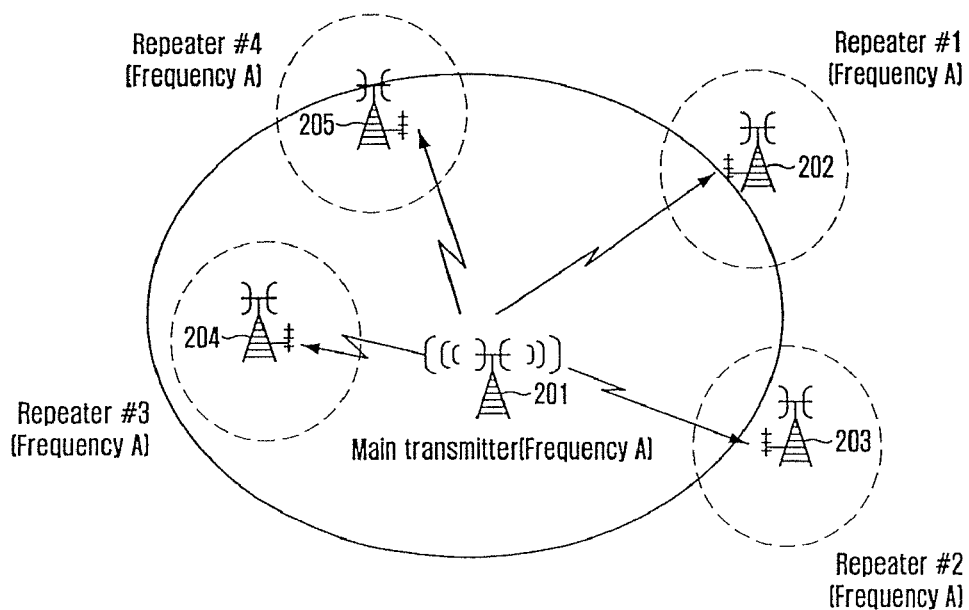
FIG. 2 shows a conventional repeating system using the same frequency among repeaters.
Figure 3:
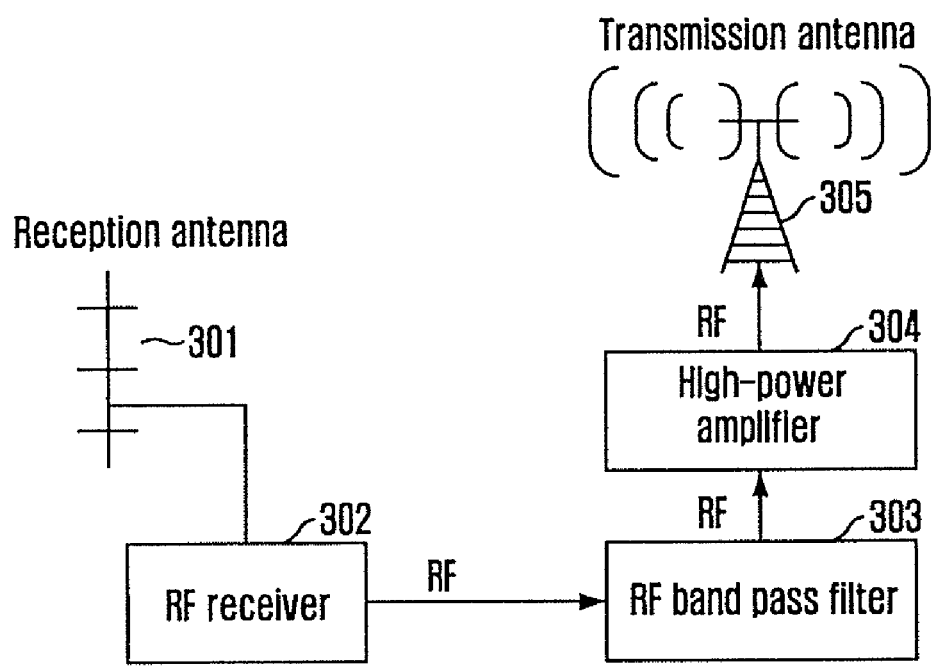
FIG. 3 shows a conventional RF amplifying on-channel repeater.
Figure 4:
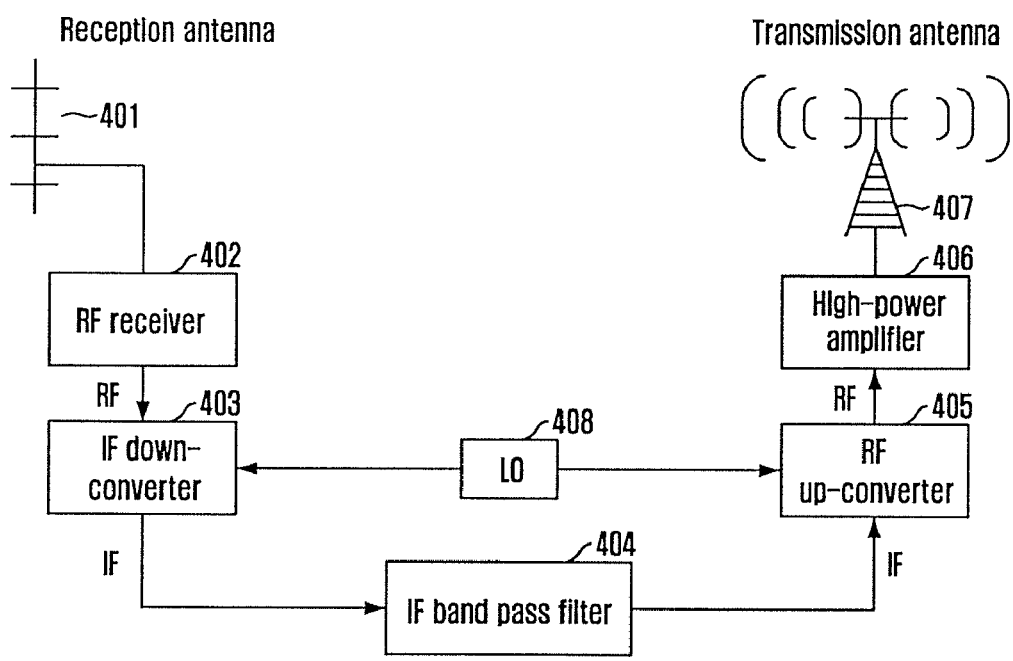
FIG. 4 illustrates a conventional IF converting on-channel repeater.
Figure 5:
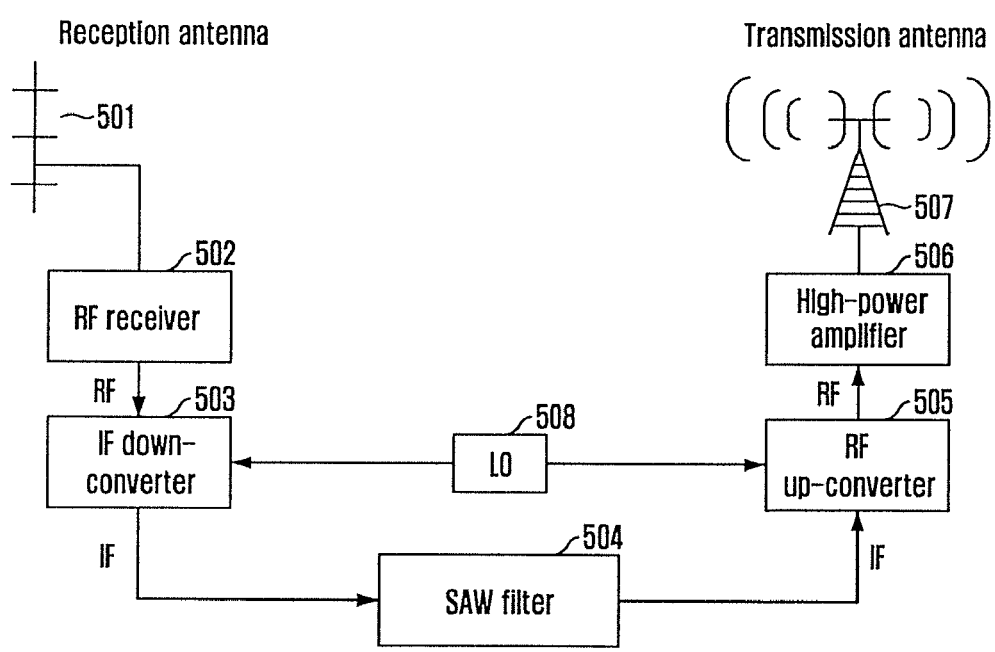
FIG. 5 illustrates a conventional on-channel repeater employing a Surface Acoustic Wave (SAW) filter.
Figure 6:
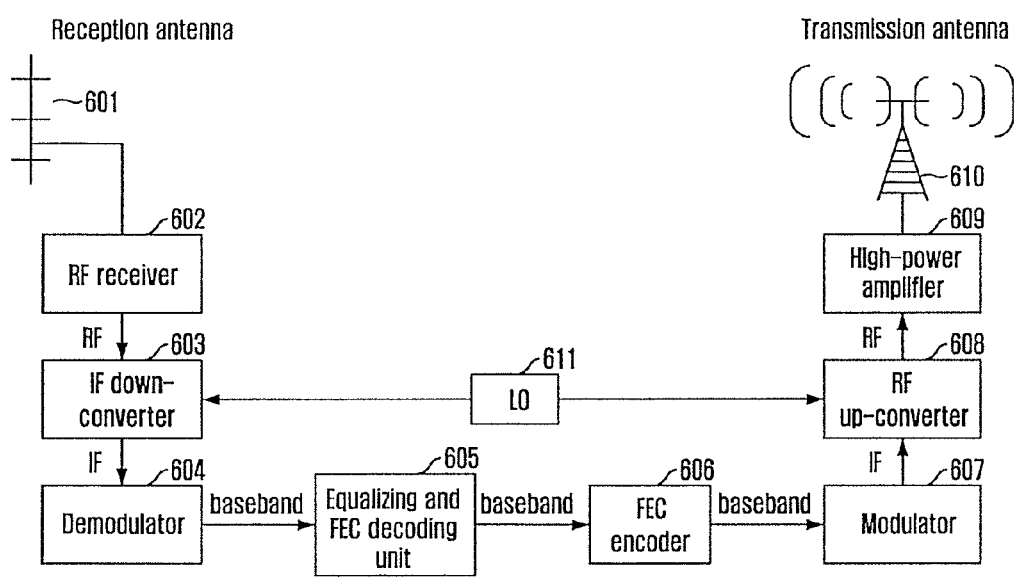
FIG. 6 shows a conventional on-channel repeater executing modulation and demodulation.
Figure 7:
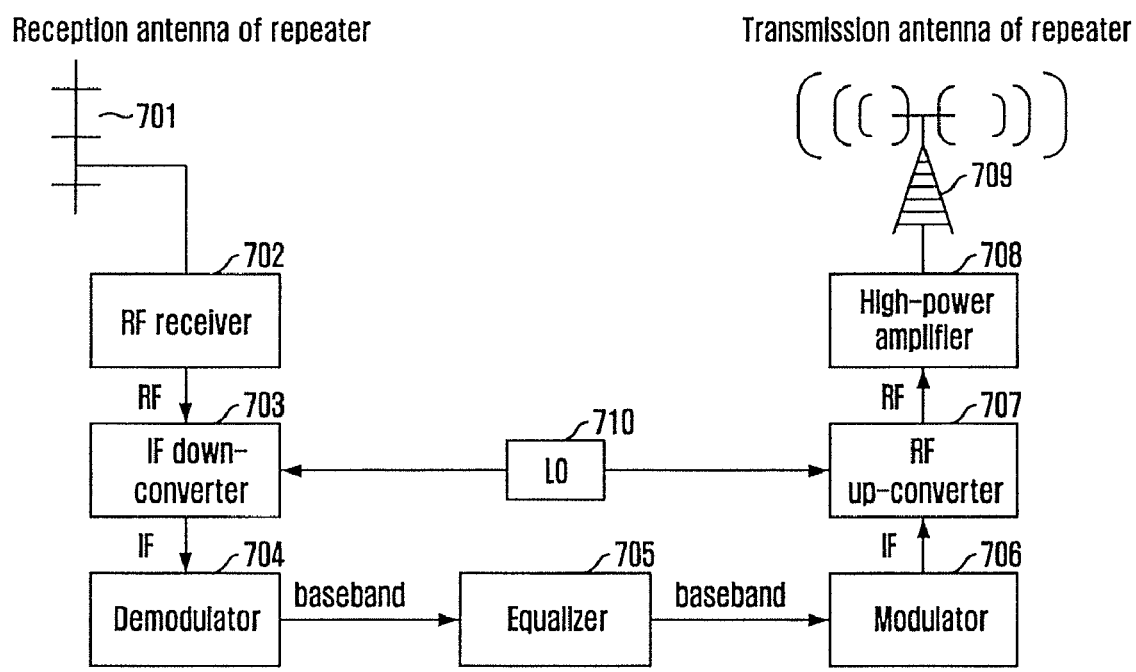
FIG. 7 is a block diagram illustrating a conventional on-channel repeater employing an equalizer.

The advantages, features and aspects of the invention will become apparent from the following description of the embodiments with reference to the accompanying drawings, which is set forth hereinafter.

The technology of the present invention removes feedback signals by subtracting replica from signals received in an on-channel repeater. Replica is calculated based on the signals obtained by subtracting replica from the signals received in the on-channel repeater and signals repeating processed by the on-channel repeater. Herein, the signals received in the on-channel repeater may be signals obtained after down-conversion or conversion into digital according to the structure of the on-channel repeater. The down-conversion may include down-conversion into intermediate frequency (IF) or down-conversion into baseband frequency. In this case, the repeating processed signals may be down-converted or digital converted according to the signals received in the on-channel repeater in order to calculate replica. The down-conversion may include down-conversion into IF or down-conversion into baseband frequency. The repeating processed signals may be signals obtained after modulation and demodulation process as a conventional repeater in order to resolve instable and weak signal reception. Further, the repeating processed signals may be signals after equalization process in order to resolve instable and weak signal reception.

According to an embodiment of the present invention, the on-channel repeater includes a radio frequency (RF) receiver for receiving RF signals, a subtractor for subtracting replica from the received signals, a repeating process unit for performing an repeating process onto the output signals of the subtractor, and a replica generator for calculating replica based on the output signals of the subtractor and the repeating processed signals and feeding the replica back to the subtractor.

The repeating process unit may include a demodulator for demodulating the output signals of the subtractor, and a modulator for modulating the demodulated signals. As for the subtractor, the subtractor subtracts replica from signals which are not demodulated yet. Thus, when the repeating process unit demodulates the output signals of the subtractor, it is required to perform a process of modulating the demodulated signals for subtraction. The modulator may be included in the replica generator.

Meanwhile, the repeating process unit may include a demodulator for demodulating the output signals of the subtractor, an equalizer for equalizing the demodulated signals, and a modulator for modulating the equalized signals.

Hereafter, the signals inputted to the subtractor may be signals obtained by down-converting or digital-converting the RF signals inputted from a reception antenna. The down-conversion may include down-conversion into intermediate frequency or down-conversion into baseband frequency. Also, according to the signals inputted to the subtractor, the repeating process unit may perform up-conversion or analog conversion. Accordingly, the signals inputted from the repeating process unit to the replica generator may be signals obtained after down-conversion or digital conversion.

For example, the RF receiver includes a first down-converter for down-converting RF signals into signals of a predetermined band, and the repeating process unit further includes an up-converter for up-converting modulated signals into RF signals. The replica generator may further include a second down-converter for down-converting up-converted signals into signals of a predetermined band. Herein, the predetermined band may be baseband. Also, the demodulator may convert and demodulate output signals of the subtractor into baseband signals.

For another example, the RF receiver includes a first IF down-converter for down-converting RF signals into IF signals and a first baseband converter for the IF signals obtained from the first down-conversion into baseband signals. The repeating process unit further includes an up-converter for up-converting modulated signals into RF signals. The replica generator may include a second IF down-converter for down-converting the RF signals obtained from the up-conversion into IF signals and a second baseband converter for converting the IF signals obtained from the second down-conversion into baseband signals. Herein, the RF receiver may further include a first analog-to-digital converter (ADC) for converting the IF signals obtained from the first down-conversion into digital signals, and the repeating process unit may further include a digital-to-analog converter (DAC) for converting modulated signals into analog signals. The replica generator may further include a second analog-to-digital converter for converting the IF signals obtained from the second down-conversion into digital signals.

Hereafter, embodiments of the present invention will be described with reference to the accompanying drawings.

Figure 8:
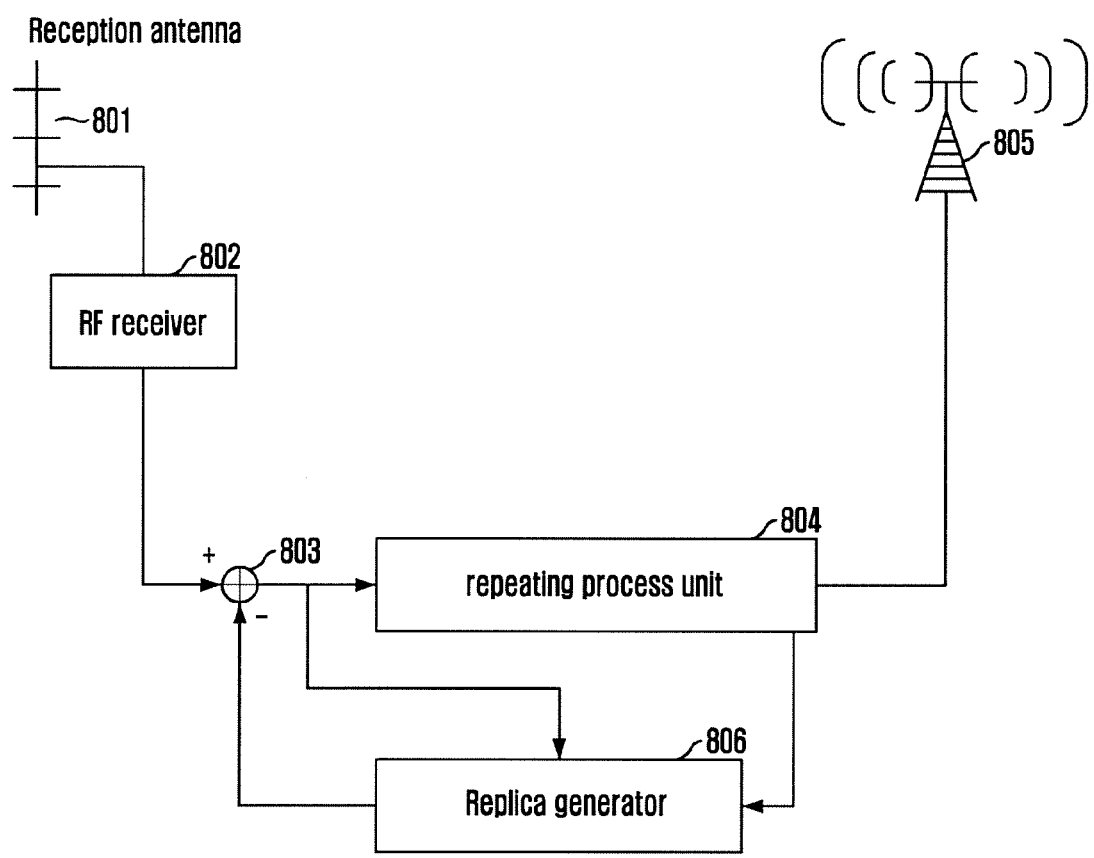
FIG. 8 is a block diagram describing an on-channel repeater in accordance with a first embodiment of the present invention.

FIG. 8 is a block diagram describing an on-channel repeater in accordance with a first embodiment of the present invention. Referring to FIG. 8, the on-channel repeater of the first embodiment includes a reception antenna 801, an RF receiver 802, a subtractor 803, a repeating process unit 804, a transmission antenna 805, and a replica generator 806.

RF signals received from a main transmitter or another repeater through the reception antenna 801 go through a predetermined signal processing and are inputted to the subtractor 803.

The subtractor 803 subtracts replica, which is a feedback signal, from signals processed by the RF receiver 802.

The repeating process unit 804 performs a predetermined repeating process onto output signals of the subtractor 803 and transmits the output signals in the air through the transmission antenna 805. The signals obtained after the predetermined repeating process are supplied to the replica generator 806.

The replica generator 806 generates replica based on an output signal of the repeating process unit 804 and an output signal of the subtractor 803, and feeds the replica back to the subtractor 803.

Figure 9:
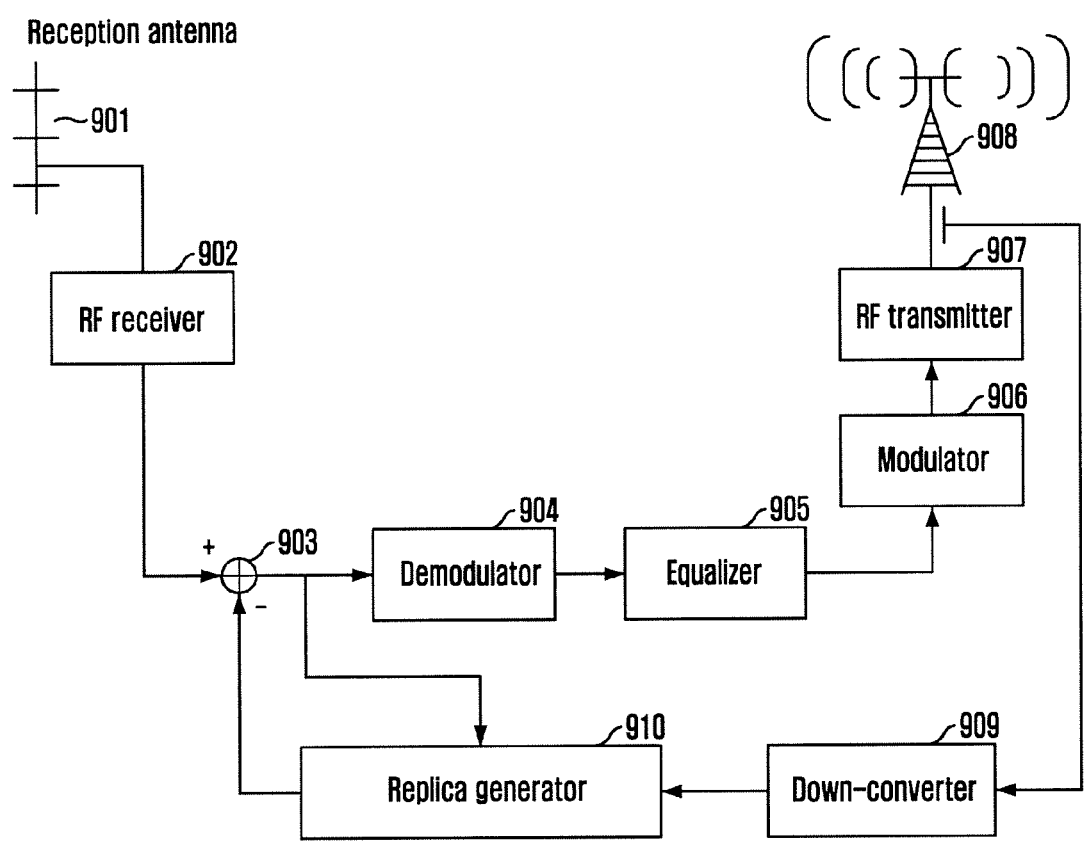
FIG. 9 is a block diagram describing an on-channel repeater in accordance with a second embodiment of the present invention.

FIG. 9 is a block diagram describing an on-channel repeater in accordance with a second embodiment of the present invention. Referring to FIG. 9, the on-channel repeater of the second embodiment includes a reception antenna 901, an RF receiver 902, a subtractor 903, a demodulator 904, an equalizer 905, a modulator 906, an RF transmitter 907, a transmission antenna 908, a down-converter 909, and a replica generator 910.

RF signals received through the reception antenna 901 from a main transmitter or another repeater are down-converted into signals of a predetermined band in the RF receiver 902.

The subtractor 903 primarily removes feedback signals from the signals of the predetermined band obtained from the down-conversion in the RF receiver 902 by subtracting replica of the feedback signals. The demodulator 904 demodulates the output signals of the subtractor obtained in the subtractor 903. Herein, the demodulator 904 may convert the output signals of the subtractor obtained from the subtraction in the subtractor 903 into baseband signals.

The equalizer 905 equalizes the baseband signals obtained from the demodulator 904 to thereby remove noise, multipath signals, and feedback signals left behind the primary feedback signals removal on a reception channel of the repeater from the baseband signals obtained from the demodulator 904.

The modulator 906 modulates the output signals of the equalizer 905. Herein, the modulator 906 may convert the output signals of the equalizer 905 into IF signals, and the RF transmitter 907 converts the signals outputted from the modulator 906 into RF signals and transmits the RF signals through the transmission antenna 908 in the air.

The down-converter 909 down-converts the RF signals obtained in the RF transmitter 907 into the signals of the predetermined band.

The replica generator 910 generates replica of feedback signals based on the signals of the predetermined band obtained from the down-conversion in the down-converter 909 and the signals outputted from the subtractor 903 whose feedback signals are primarily removed, and feeds the replica back to the subtractor 903.

Figure 10:
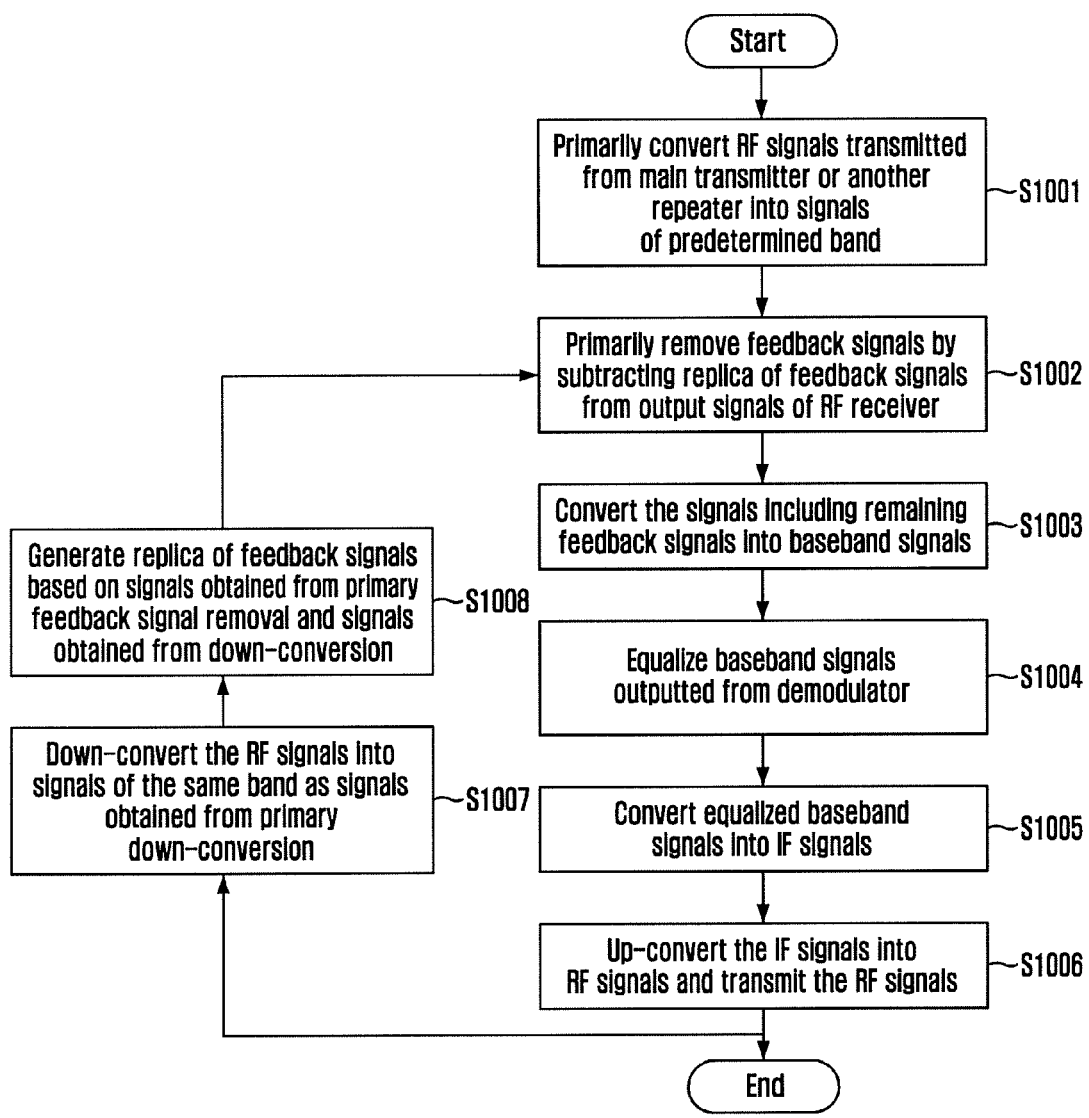
FIG. 10 is a flowchart describing a repeating method executed in the on-channel repeater of FIG. 9.

FIG. 10 is a flowchart describing a repeating method executed in the on-channel repeater of FIG. 9.

Referring to FIG. 10, RF signals transmitted from a main transmitter or another repeater are received through the reception antenna 901, and the RF receiver 902 down-converts the RF signals into signals of a predetermined band in step S1001.

In step S1002, the subtractor 903 primarily removes feedback signals from the output signals of the RF receiver 902 by subtracting replica of the feedback signals generated in the replica generator 910.

In step S1003, the demodulator 904 demodulates the output signals of the subtractor 903, which are signals of a predetermined band with their feedback signals primarily removed. Herein, the demodulator 904 may convert the output signals of the subtractor 903 into baseband signals.

In step S1004, the equalizer 905 removes noise, multipath signals, and remaining feedback signals that are caused on a reception channel of the repeater from the baseband signals by equalizing the baseband signals outputted from the demodulator 904.

In step S1005, the modulator 906 modulates the baseband signals outputted from the equalizer 905. Herein, the modulator 906 may convert the baseband signals outputted from the equalizer 905 into IF signals.

In step S1006, the RF transmitter 907 up-converts the IF signals outputted from the modulator 906 into RF signals and transmits the RF signals in the air through the transmission antenna 908.

In step S1007, the down-converter 909 down-converts the RF signals obtained in the RF transmitter 907 into signals of the predetermined band (which is a band into which signals are converted in the RF receiver 902).

In step S1008, the replica generator 910 generates replica of feedback signals based on the signals of the predetermined band obtained from the down-conversion in the down-converter 909 and the signals outputted from the subtractor 903, which are the signals from which feedback signals are primarily removed, and feeds the replica back to the subtractor 903.

Figure 11:
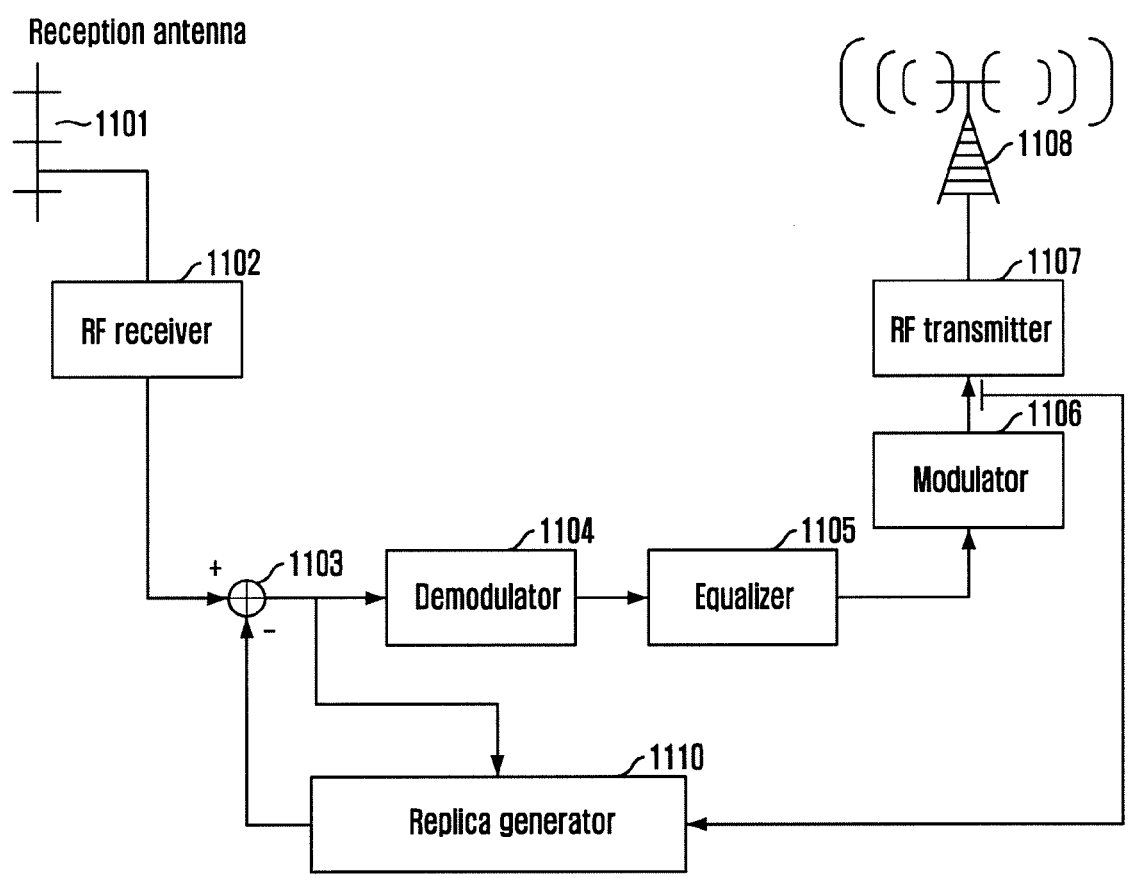
FIG. 11 is a block diagram describing an on-channel repeater in accordance with a third embodiment of the present invention.

FIG. 11 is a block diagram describing an on-channel repeater in accordance with a third embodiment of the present invention. The on-channel repeater illustrated in FIG. 11 has a similar structure to the on-channel repeater described with reference to FIG. 9. If there is any difference, signals outputted from a modulator 1106 are inputted to a replica generator 1110 and do not pass through the down-converter 909 depicted in FIG. 9. In the third embodiment of the present invention, the output signals of the modulator 1106 need not pass through the down-converter 909. This is because the signals inputted to the replica generator 1110 are output signals of the modulators 1106, and the output signals of the modulator 1106 are not up-converted into RF signals yet. Since the other parts are the same as what is described with reference to FIG. 9, further description will not be provided herein.

Figure 12:
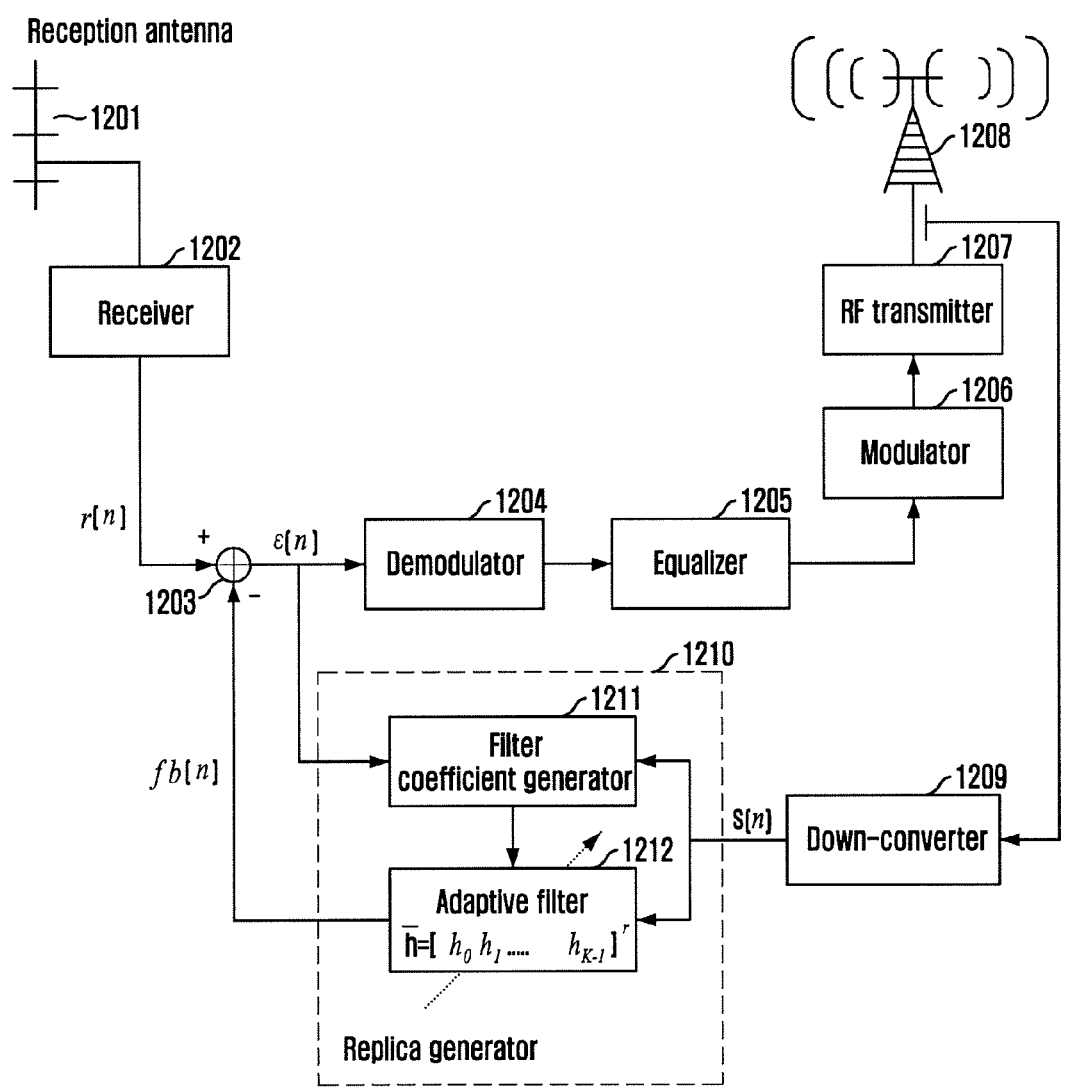
FIG. 12 is a block diagram describing an on-channel repeater in accordance with a fourth embodiment of the present invention.

FIG. 12 is a block diagram describing an on-channel repeater in accordance with a fourth embodiment of the present invention. Accordingly, a reception antenna 1201, an RF receiver 1202, a demodulator 1204, an equalizer 1205, a modulator 1206, an RF transmitter 1207, a transmission antenna 1208, and a down-converter 1209 correspond to the reception antenna 901, the RF receiver 902, the demodulator 904, the equalizer 905, the modulator 906, the RF transmitter 907, the transmission antenna 908, and the down-converter 909 shown in FIG. 9, respectively.

Meanwhile, the replica generator 1210 includes a filter coefficient generator 1211 and an adaptive filter 1212. The filter coefficient generator 1211 generates a filter tap coefficient of the adaptive filter 1212 based on the signals of the predetermined band acquired in the down-converter 1209 and the signals outputted from the subtractor 1203 (which are signals whose feedback signals are primarily removed). The adaptive filter 1212 generates replica of feedback signals by using the filter tap coefficient generated in the filter coefficient generator 1211 and filtering the signals outputted from the down-converter 1209.

The filter coefficient generator 1211 calculates a filter tap coefficient vector ($\overline{h_n}$) at a time index n based on a Least Mean Square (LMS) algorithm and the following Equation 1.

$$\overline{h_n} = \overline{h_{n-1}} + \lambda \cdot \epsilon(n) \cdot \overline{s_n}^*$$

$$\overline{h_n} = [h_0(n) h_1(n) \ldots h_{K-1}(n)]^T$$

$$\overline{h_{n-1}} = [h_0(n-1) h_1(n-1) \ldots h_{K-1}(n-1)]^T$$

$$\overline{s_n} = [s(n) s(n-1) \ldots s(n-K+1)]^T \quad \text{Eq. 1}$$

where $\bar{s}_n$ denotes a signal vector down-converted into the predetermined band in the down-converter 1209 at a time index n; ε(n) denotes a signal vector outputted from the subtractor 1203 at the time index n; λ denotes a constant determining a convergence rate; K denotes the number of filter taps; T denotes a transpose; and * denotes a complex conjugate.

The adaptive filter 1212 calculates replica (fb(n)) of feedback signals based on the filter tap coefficient vector ($\bar{h}_n$) at the time index n which is outputted from the filter coefficient generator 1211 and the signal vector ($\bar{s}_n$) outputted from the down-converter 1209 at the time index n, and the following Equation 2.

$$fb(n) = \bar{h}_n^T \cdot \bar{s}_n \qquad \text{Eq. 2}$$

The subtractor 1203 primarily removes feedback signals caused due to low isolation of the transmission and reception antennas by subtracting replica (fb(n)) of the feedback signals outputted from the adaptive filter 1212 from the output signals (r(n)) of the RF receiver 1202 according to the following Equation 3.

$$\epsilon(n+1) = r(n) - fb(n) \qquad \text{Eq. 3}$$

Figure 13:
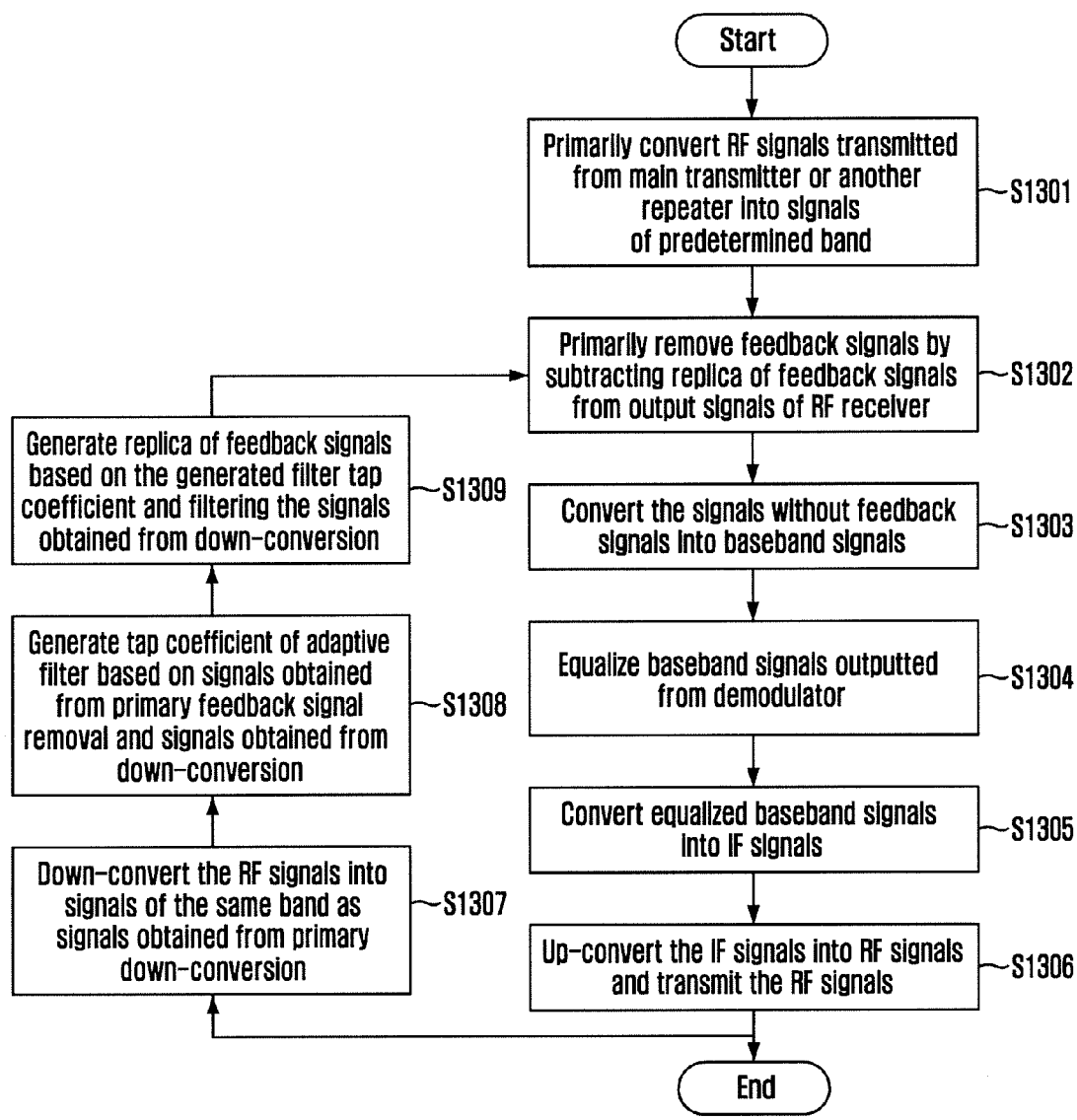
FIG. 13 is a flowchart describing a repeating method executed in the on-channel repeater of FIG. 12.

FIG. 13 is a flowchart describing a repeating method executed in the on-channel repeater of FIG. 12 in detail.

Referring to FIGS. 12 and 13, in step S1301, RF signals transmitted from the main transmitter or another repeater are received through the reception antenna 1201, and the RF receiver 1202 down-converts the RF signals into signals of a predetermined band.

In step S1302, the subtractor 1203 primarily removes feedback signals from the output signals of the RF receiver 1202 by subtracting replica of the feedback signals generated in the replica generator 1210.

In step S1303, the demodulator 1204 demodulates the output signals of the subtractor 1203, which are the signals of the predetermined band from which the feedback signals are primarily removed. Herein, the demodulator 1204 may convert the output signals of the subtractor 1203 into baseband signals.

In step S1304, the equalizer 1205 equalizes the baseband signals outputted from the demodulator 1204 to thereby remove noise, multipath signals, and the remaining feedback signals that are caused on a reception channel of the repeater from the baseband signals.

In step S1305, the modulator 1206 modulates the baseband signals outputted from the equalizer 1205. Herein, the modulator 1206 may convert the baseband signals outputted from the equalizer 1205 into IF signals.

In step S1306, the RF transmitter 1207 up-converts the IF signals outputted from the modulator 1206 into RF signals and transmits the RF signals in the air through the transmission antenna.

In step S1307, the down-converter 1209 down-converts the RF signals acquired from the RF transmitter 1207 into the signals of the predetermined band (i.e., the band acquired from the conversion in the RF receiver 1202).

In step S1308, the filter coefficient generator 1211 of the replica generator 1210 generates a filter tap coefficient of the adaptive filter 1212 based on the signals of the predetermined band acquired from the down-conversion in the down-converter 1209 and the signals outputted from the subtractor 1203 (which are the signals from which the feedback signals are primarily removed). In step S1309, replica of the feedback signals are generated by using the filter tap coefficient generated in the filter coefficient generator 1211 and filtering the signals outputted from the down-converter 1209.

Figure 14:
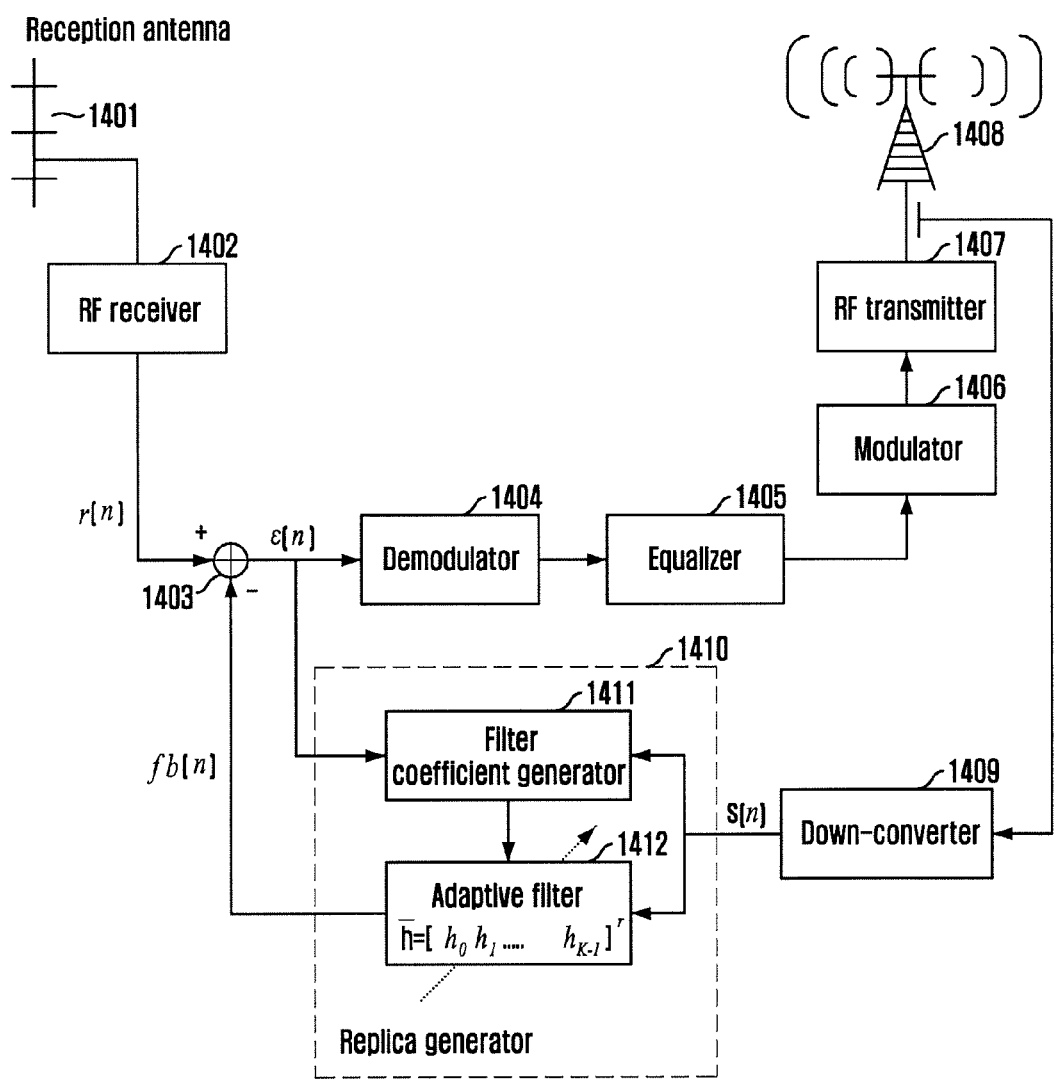
FIG. 14 is a block diagram describing an on-channel repeater in accordance with a fifth embodiment of the present invention.

FIG. 14 is a block diagram describing an on-channel repeater in accordance with a fifth embodiment of the present invention. The on-channel repeater illustrated in FIG. 14 has a similar structure to the on-channel repeater described with reference to FIG. 12. If there is any difference, signals outputted from a modulator 1406 are inputted to a replica generator 1410 and do not pass through the down-converter 1209 depicted in FIG. 12. In the third embodiment of the present invention, the output signals of the modulator 1406 need not pass through the down-converter 1209. This is because the signals inputted to the replica generator 1410 are output signals of the modulators 1406, and the output signals of the modulator 1406 are not up-converted into RF signals yet. Since the other parts are the same as what is described with reference to FIG. 12, further description will not be provided herein.

Figure 15:
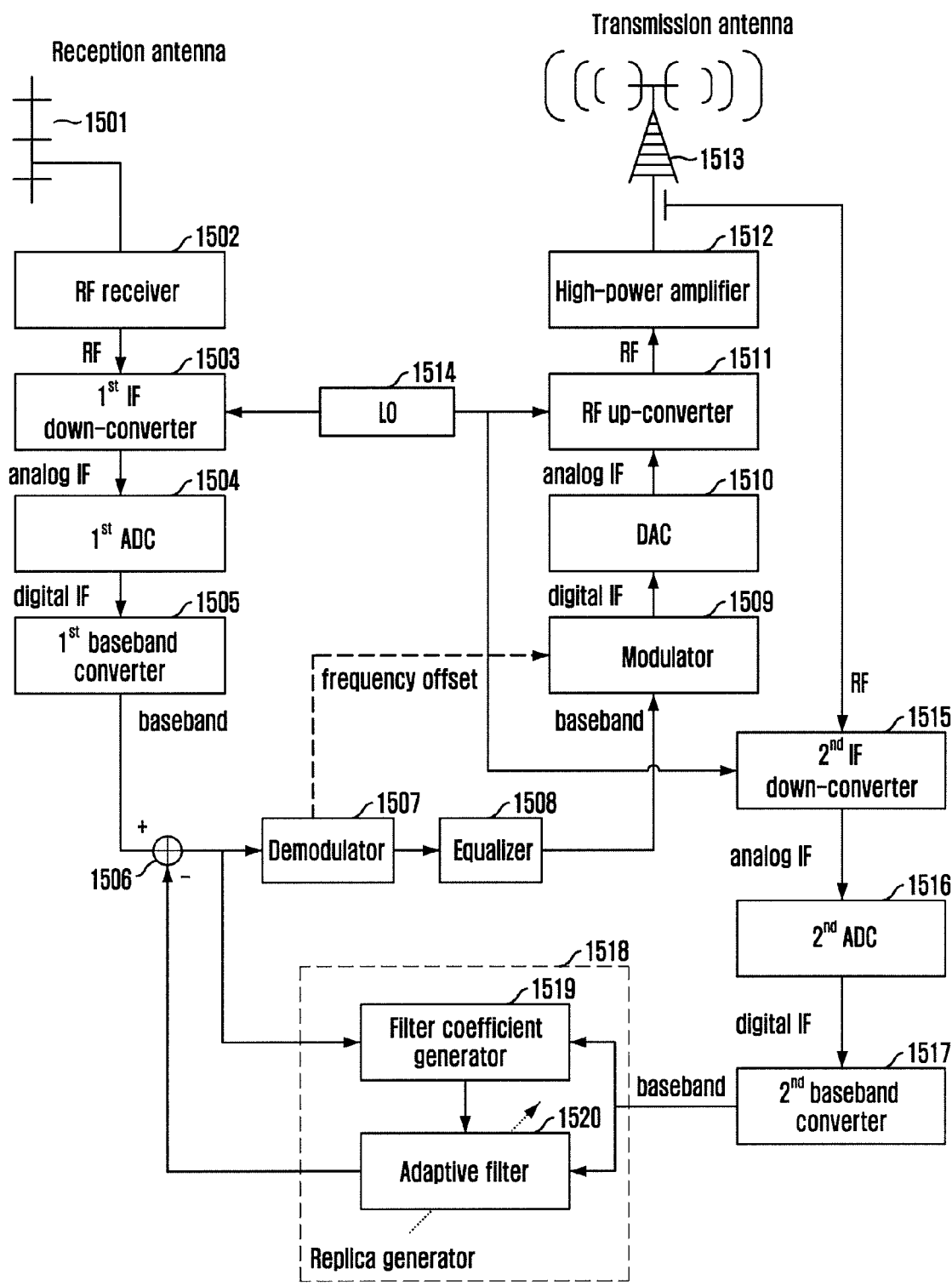
FIG. 15 is a block diagram describing an on-channel repeater in accordance with a sixth embodiment of the present invention.

FIG. 15 is a block diagram illustrating an on-channel repeater in accordance with a sixth embodiment of the present invention.

Referring to FIG. 12, the on-channel repeater, which is suggested in this embodiment of the present invention, includes a reception antenna 1501, an RF receiver 1502, a first IF down-converter 1503, a first analog-to-digital converter (ADC) 1504, a first baseband converter 1505, a subtractor 1506, a demodulator 1507, an equalizer 1508, a modulator 1509, a digital-to-analog converter (DAC) 1510, an RF up-converter 1511, a high-power amplifier 1512, a transmission antenna 1513, a second IF down-converter 1515, a second analog-to-digital converter 1516, a second baseband converter 1517, a replica generator 1518, and a local oscillator 1514.

The replica generator 1518 includes a filter coefficient generator 1519 and an adaptive filter 1520.

The RF receiver 1502 receives RF signals from a main transmitter or another repeater through the reception antenna 1501.

The first IF down-converter 1503 down-converts the received RF signals into IF signals based on a reference frequency supplied from the local oscillator 1514. The first analog-to-digital converter 1504 converts the analog IF signals outputted from the first IF down-converter 1503 into digital IF signals. The first baseband converter 1505 converts the output signals of the first analog-to-digital converter 1504 into baseband signals.

The subtractor 1506 primarily removes feedback signals by subtracting replica of the feedback signals from the baseband signals outputted from the first baseband converter 1505. The demodulator 1507 demodulates the signals whose feedback signals are primarily removed, which are outputted from the subtractor 1506, through frequency and timing synchronization and produces carrier frequency offsets.

The equalizer 1508 eliminates noise, multipath signals and feedback signals remaining after the primary feedback signal removal on a repeater reception channel from the baseband signals outputted from the demodulator 1507.

The modulator 1509 modulates the signals outputted from the equalizer 1508 by using the carrier frequency offsets produced in the demodulator 1507. Herein, the modulator 1509 may convert the output signals of the equalizer 1508 into IF signals by using the carrier frequency offsets produced in the demodulator 1507. The digital-to-analog converter 1510 converts the digital IF signals outputted from the modulator 1509 into analog IF signals. The RF up-converter 1511 up-converts the output signals of the digital-to-analog converter 1510 into RF signals based on a reference frequency supplied from the local oscillator 1514.

The RF signals obtained from the up-conversion in the RF up-converter 1511 are amplified in the high-power amplifier 1512 and transmitted in the air through the transmission antenna 1513.

Meanwhile, the second IF down-converter 1515 down-converts the RF signal amplified in the high-power amplifier 1512 into IF signals, which have the same band as the analog IF signals obtained from down-conversion in the first IF down-converter 1503. Herein, a reference frequency supplied from the local oscillator 1514 is used.

The second analog-to-digital converter 1516 converts the output signals of the second IF down-converter 1515 into digital IF signals. The second baseband converter 1517 converts the output signals of the second analog-to-digital converter 1516 into baseband signals.

The replica generator 1518 generates replica of feedback signals based on the baseband signals outputted from the second baseband converter 1517 and the signals whose feedback signals are primarily removed, which are outputted from the subtractor 1506, and feeds the replica back to the subtractor 1506.

The structure and operation of the replica generator 1518 are the same as those of the replica generator illustrated by referring to FIGS. 8 to 14, except that the input signals and the output signals of the replica generator 1518 are different.

Figure 16:
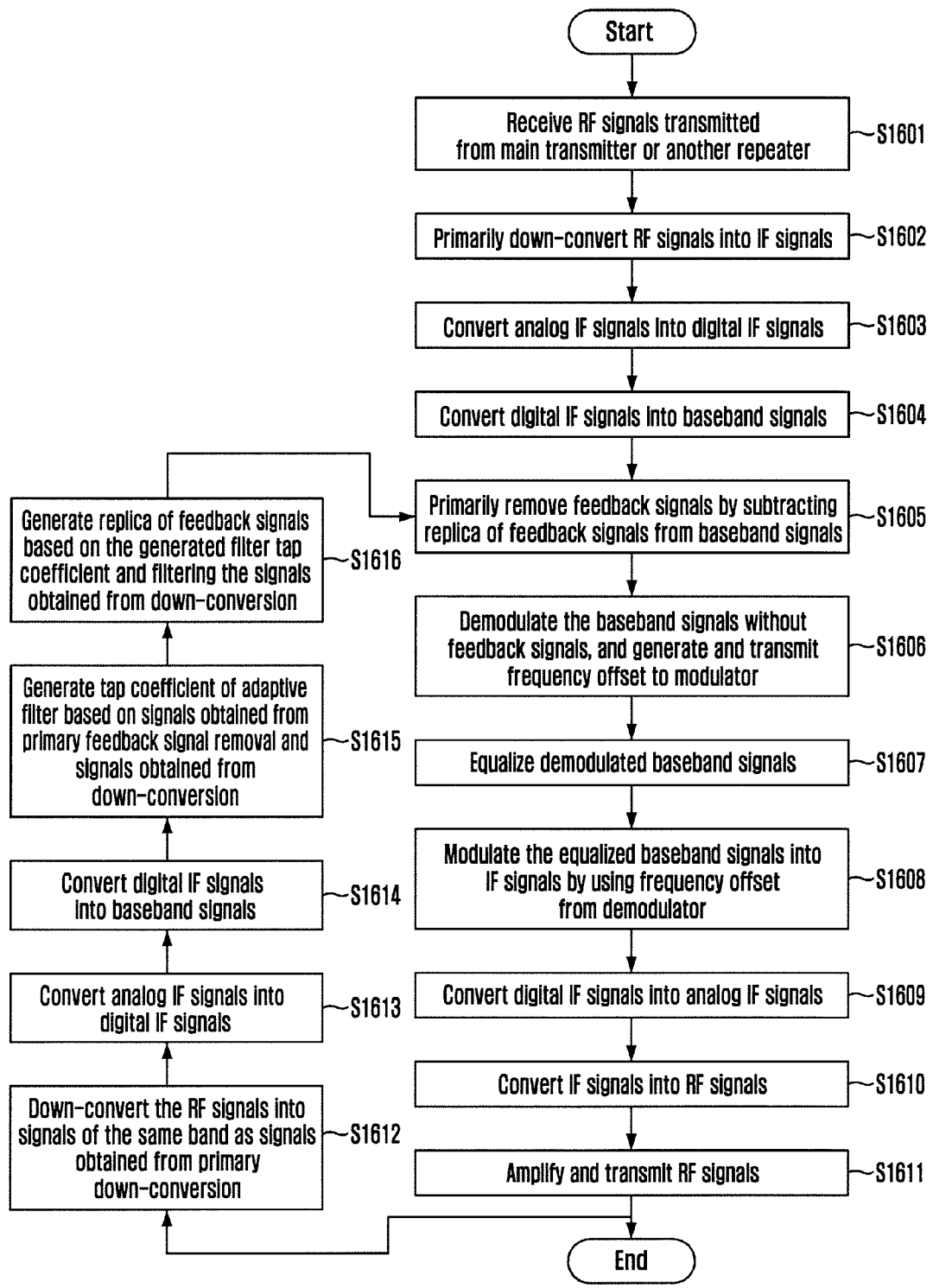
FIG. 16 is a flowchart describing a repeating method executed in the on-channel repeater of FIG. 15.

FIG. 16 is a flowchart describing a repeating method executed in the on-channel repeater of FIG. 15.

Referring to FIG. 16, in step S1601, RF signals are received from the main transmitter or another repeater through the reception antenna 1501 and the RF receiver 1502. In step S1602, the received RF signals are down-converted into IF signals in the first IF down-converter 1503.

In step S1603, the first analog-to-digital converter 1504 converts the analog IF signals outputted from the first IF down-converter 1503 into digital IF signals. In step S1604, the first baseband converter 1505 converts the digital IF signals outputted from the first analog-to-digital converter 1504 into baseband signals.

In step S1605, the subtractor 1506 primarily removes feedback signals by subtracting replica of the feedback signals from the baseband signals obtained in the first baseband converter 1505. In step S1606, the demodulator 1507 demodulates the signals whose the feedback signals are primarily removed therefrom, which is obtained in the subtractor 1506, through frequency and timing synchronization, and produces carrier frequency offsets. That is, carrier frequency error information is extracted.

In step S1607, the equalizer 1508 removes noise, multipath signals, and feedback signals remaining after the primary feedback signal removal on a repeater reception channel from the baseband signals obtained from the demodulator 1507. In step S1608, the modulator 1509 modulates the signals outputted from the equalizer 1508. Herein, the demodulator 1507 may convert the output signals of the equalizer 1508 into IF signals by using the carrier frequency offsets, which is also referred to as carrier frequency error information, produced in the demodulator 1507.

In step S1609, the digital-to-analog converter 1510 converts the digital IF signals outputted from the modulator 1509 into analog IF signals. In step S1610, the RF up-converter 1511 up-converts the output signals of the digital-to-analog converter 1510 into RF signals based on a reference frequency supplied from the local oscillator 1514.

In step S1611, the RF signals obtained from the up-conversion in the RF up-converter 1511 are amplified in the high-power amplifier 1512 and transmitted in the air through the transmission antenna 1513.

Meanwhile, in step S1612, the amplified RF signals obtained in the high-power amplifier 1512 are down-converted into IF signals in the second IF down-converter 1515, which are of the same band as the analog IF signals obtained from down-conversion in the first IF down-converter 1503. Herein, a reference frequency supplied from the local oscillator 1514 is used.

In step S1613, the second analog-to-digital converter 1516 converts the analog IF signals outputted from the second IF down-converter 1515 into digital IF signals. In step S1614, the second baseband converter 1517 converts the digital IF signals outputted from the second analog-to-digital converter 1516 into baseband signals. The replica generator 1518 generates replica of feedback signals based on the baseband signals outputted from the second baseband converter 1517 and the signals whose the feedback signals are primarily removed therefrom, which are outputted from the subtractor 1506, and feeds the replica back to the subtractor 1506.

In short, in step S1615, the filter coefficient generator 1519 of the replica generator 1518 generates a filter tap coefficient of the adaptive filter 1520 based on the baseband signals outputted from the second baseband converter 1517 and the signals whose the feedback signals are primarily removed therefrom, which are outputted from the subtractor 1506. In step S1616, the adaptive filter 1520 filters the baseband signals obtained from the down-conversion in the second baseband converter 1517 based on the filter tap coefficient generated in the filter coefficient generator 1519 to thereby generate replica of the feedback signals.

Figure 17:
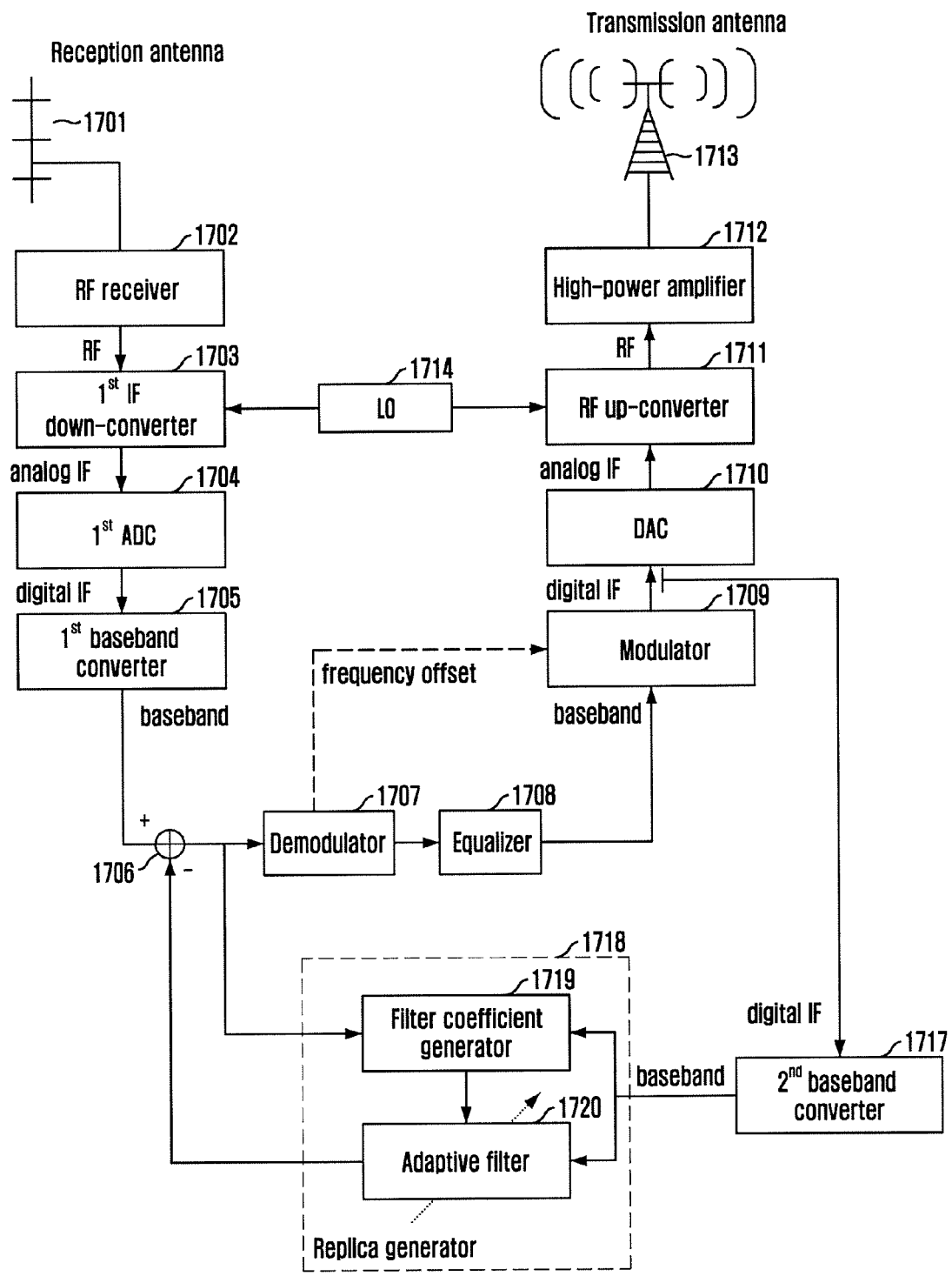
FIG. 17 is a block diagram illustrating an on-channel repeater in accordance with a seventh embodiment of the present invention.

FIG. 17 is a block diagram illustrating an on-channel repeater in accordance with a seventh embodiment of the present invention. The on-channel repeater illustrated in FIG. 17 has a similar structure to the on-channel repeater described with reference to FIG. 15. If there is any difference, signals outputted from a modulator 1709 are inputted to a replica generator 1718, passing through a second baseband converter 1717. Since the other parts are the same as what is described with reference to FIG. 15, further description will not be provided herein.

Figure 18:
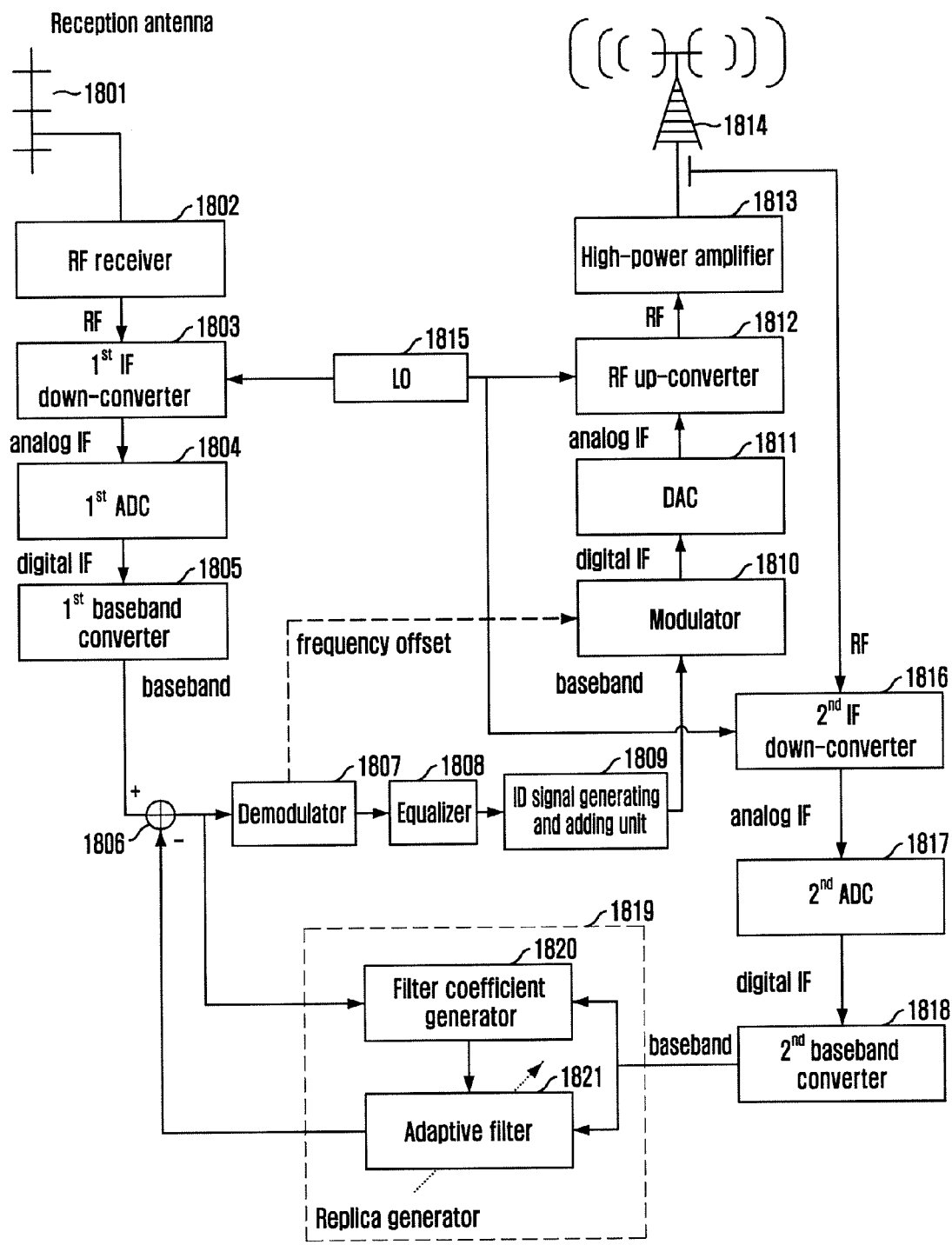
FIG. 18 is a block diagram illustrating an on-channel repeater in accordance with an eighth embodiment of the present invention.

FIG. 18 is a block diagram illustrating an on-channel repeater in accordance with an eighth embodiment of the present invention. Since the on-channel repeater of this embodiment has the same constituent elements and functions as those of FIG. 15, except for an identification (ID) signal generating and adding unit 1809, detailed description on the constituent elements and their functions will not be repeated herein.

The ID signal generating and adding unit 1809 generates ID signals with excellent auto-correlation and cross-correlation characteristics, and adds the ID signals into the output signals of the equalizer 1808 to identify a repeater and control a network.

In case of sequences v(n) and w(n) with excellent correlation characteristics, their auto-correlation characteristic $R_v(\tau)$, which indicates correlation with a self-sequence, can be represented as the following Equation 4. Cross-correlation characteristic $R_{v,w}(\tau)$, which indicates correlation with another sequence, can be represented as the following Equation 5.

In short, auto-correlation value $R_v(0)=N$ in the case of synchronization ($\tau=0$) is sufficiently greater than the auto-correlation value ($R_v(\tau)$, $\tau \neq 0$) in the case of asynchronization ($\tau=0$) and the cross-correlation value ($R_{v,w}(\tau)$, all $\tau$) so that detection of a sequence is facilitated.

sequences with excellent correlation characteristics include m-sequence, Kasami sequence, and Gold sequence, and Advanced Television System Committee (ATSC) digital television (DTV) uses Kasami sequence whose length (or period) is 65535.

$$|R_v(\tau)| = \begin{cases} N, & \tau = 0 \\ \text{small}, & 1 \leq \tau \leq N-1 \end{cases} \quad \text{Eq. 4}$$

$$R_v(\tau) = \sum_{n=0}^{N-1} v(n) \cdot v(n-\tau)$$

where v(n) denotes a sequence; and N denotes length of a sequence.

$$|R_{v,w}(\tau)| = \text{small, all } \tau \quad \text{Eq. 5}$$

$$R_{v,w}(\tau) = \sum_{n=0}^{N-1} v(n) \cdot w(n-\tau)$$

where v(n) and w(n) denote sequences; and N denotes length of sequences.

The ID generating and adding unit 1809 generates signals with excellent correlation characteristics, adds the generated signals to the output signals of an equalizer 1808 based on the following Equation 6, and outputs them to a modulator 1810.

$$t(n) = eq(n) + \alpha \cdot v(n) \quad \text{Eq. 6}$$

where t(n) denotes an output signal from the ID signal generating and adding unit 1809; v(n) denotes a signal with excellent correlation characteristics; and eq(n) denotes an output signal of the equalizer 1808; and α denotes a constant determining the addition size of the ID signal.

Figure 19:
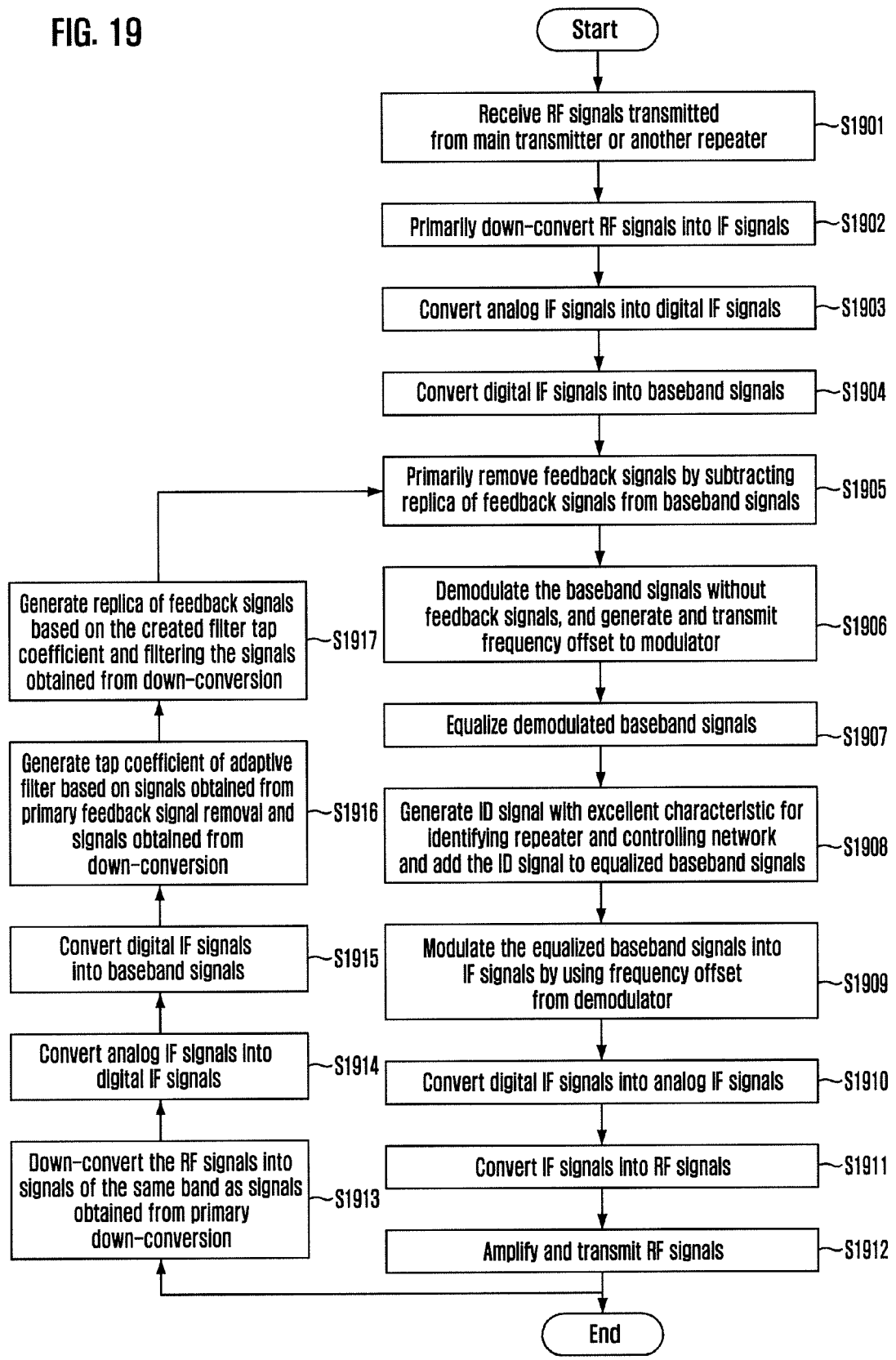
FIG. 19 is a flowchart describing a repeating method executed in the on-channel repeater of FIG. 18.

FIG. 19 is a flowchart describing a repeating method executed in the on-channel repeater of FIG. 18.

Referring to FIG. 19, in step S1901, RF signals transmitted form from the main transmitter or another repeater are received through the reception antenna 1801 and the RF receiver 1802. In step S1902, the first IF down-converter 1803 down-converts the RF signals into IF signals.

In step S1903, the first analog-to-digital converter 1804 converts the analog IF signals outputted from the first IF down-converter 1803 into digital IF signals. In step S1904, the first baseband converter 1805 converts the digital IF signals outputted from the first analog-to-digital converter 1804 into baseband signals.

In step S1905, the subtractor 1806 subtracts replica of feedback signals from the baseband signals outputted from the first baseband converter 1805 to thereby primarily remove the feedback signals. In step S1906, the demodulator 1807 demodulate the signals whose their feedback signals are primarily removed, which are outputted from the subtractor 1806, through frequency and timing synchronization, and generates carrier frequency offset. That is, carrier frequency error information is extracted.

In step S1907, the equalizer 1808 removes noise, multipath signals, and the remaining feedback signals after the primary removal on a repeater reception channel from the baseband signals obtained in the demodulator 1807. In step S1908, the ID signal generating and adding unit 1809 generates ID signals having excellent auto-correlation and cross-correlation characteristics to identify a repeater and control a network and adds the ID signals to output signals of the equalizer 1808.

In step S1909, the modulator 1810 modulates the output signals of the equalizer 1808 by using the carrier frequency offset, i.e., carrier frequency error information, generated in the demodulator 1807. Herein, the modulator 1810 may convert the output signals of the equalizer 1808 by using the carrier frequency offset, i.e., carrier frequency error information, generated in the demodulator 1807 into IF signals.

In step S1910, the digital-to-analog converter 1811 converts the digital IF signals outputted from the modulator 1810 into analog IF signals. In step S1911, the RF up-converter 1812 up-converts the analog IF signals outputted from the digital-to-analog converter 1811 into RF signals based on a reference frequency supplied from the local oscillator 1815.

In step S1912, the high-power amplifier 1813 amplifies the RF signals outputted from the RF up-converter 1812 and transmits amplified RF signals in the air through the transmission antenna 1814.

Meanwhile, in step S1913, the second IF down-converter 1816 down-converts the RF signals amplified in the high-power amplifier 1814 into IF signals, which are of the same band as the analog IF signals obtained from the down-conversion in the first IF down-converter 1803. Herein, a reference frequency supplied from the local oscillator 1815 is used.

In step S1914, the second analog-to-digital converter 1817 converts the IF signals outputted from the second IF down-converter 1816 into digital IF signals. In step S1915, the second baseband converter 1818 converts the digital IF signals outputted from the second analog-to-digital converter 1817 into baseband signals. The replica generator 1819 generates replica of feedback signals based on the baseband signals obtained in the second baseband converter 1818 and the signals whose feedback signals are primarily removed, which are outputted from the subtractor 1806, and feeds the replica back to the subtractor 1806.

In short, in step S1916, the filter coefficient generator 1820 of the replica generator 1819 generates a filter tap coefficient of the adaptive filter 1821 based on the baseband signals obtained in the second baseband converter 1818 and the signals whose feedback signals are primarily removed, which are outputted from the subtractor 1806. In step S1917, the adaptive filter 1821 filters the baseband signals obtained in the second baseband converter 1818 by using the filter tap coefficient generated in the filter coefficient generator 1820 to thereby generate the replica of the feedback signals.

Figure 20:
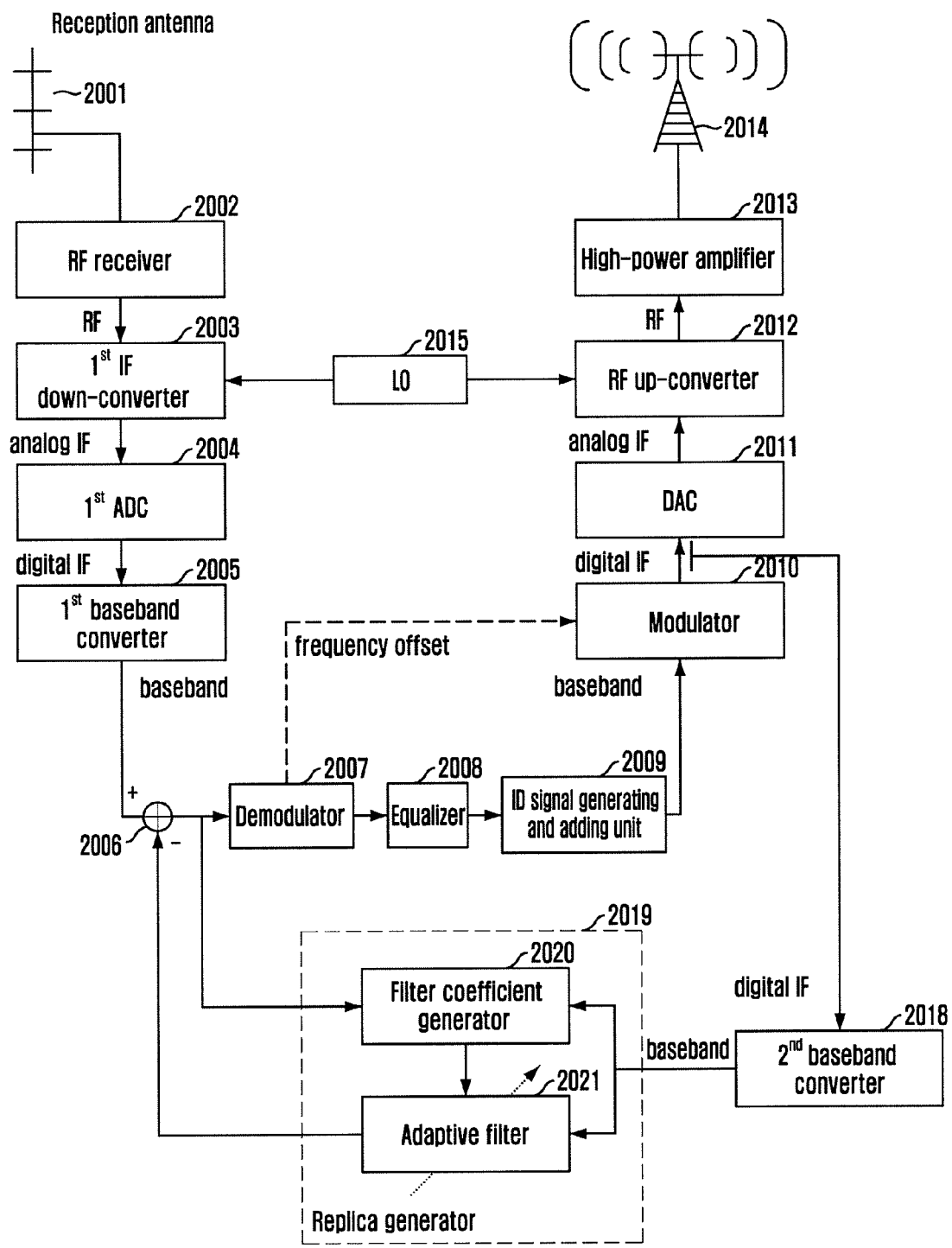
FIG. 20 is a block diagram illustrating an on-channel repeater in accordance with a ninth embodiment of the present invention.

FIG. 20 is a block diagram illustrating an on-channel repeater in accordance with a ninth embodiment of the present invention. The on-channel repeater illustrated in FIG. 20 has a similar structure to the on-channel repeater described with reference to FIG. 18. If there is any difference, signals outputted from a modulator 2010 are inputted to a replica generator 2019, passing through a second baseband converter 2018. Since the other parts are the same as what is described with reference to FIG. 18, further description will not be provided herein.

Figure 21:
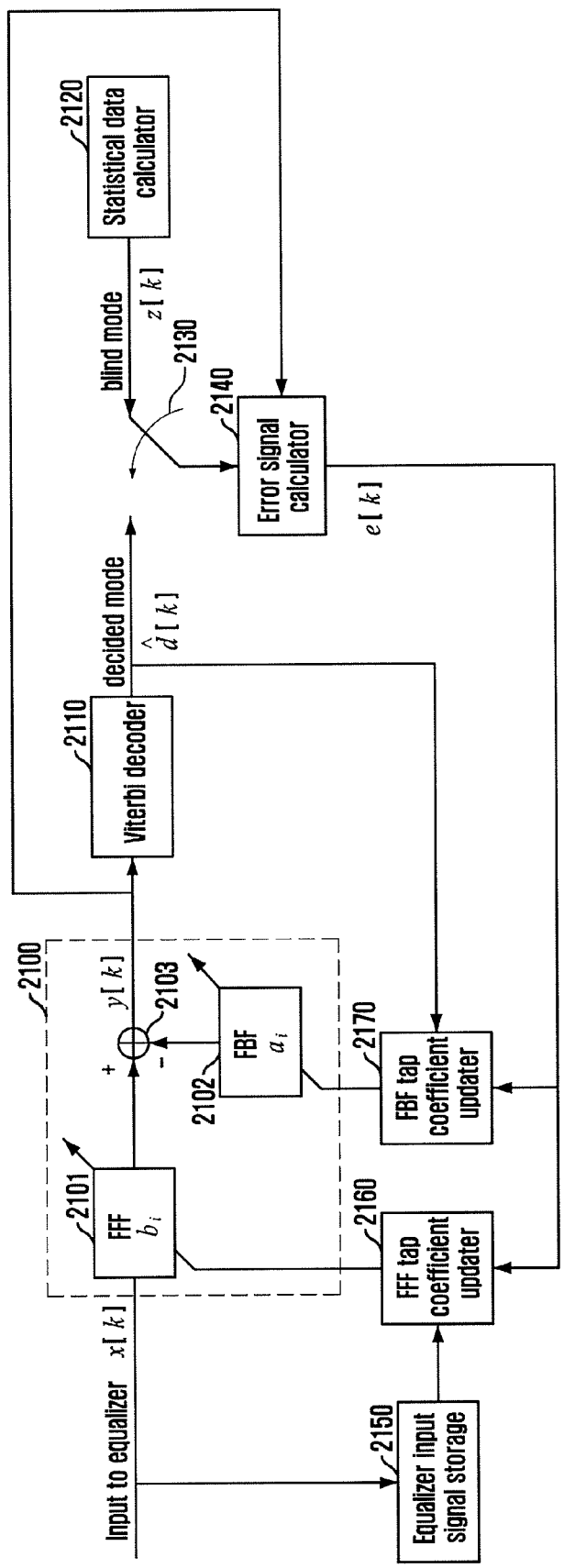
FIG. 21 is block diagram showing an equalizer included in the on-channel repeaters of the embodiments of the present invention.

FIG. 21 is block diagram showing an equalizer included in the on-channel repeaters of the embodiments of the present invention. The equalizer 905 shown in FIG. 9 is exemplarily presented.

Referring to FIG. 21, a main filter 2100 performs channel equalization by repetitively filtering baseband signals (x[k]) outputted from the demodulator 904 to thereby output baseband signals (y[k]). The main filter 2100 includes a feed forward filter (FFF) 2101 and a feedback filter (FBF) 2102.

An equalizer input signal storage 2150 stores the baseband signals (y[k]) outputted from the demodulator 904.

A Viterbi decoder 2110 decodes the baseband signals (y[k]) outputted from the main filter 2100 based on a Viterbi decoding algorithm where Trace Back Depth (TBD) is 1 and outputs decision-directed mode signals ($\hat{d}[k]$).

The Viterbi decoder 2110 may be typical Viterbi decoder, a Soft Output Viterbi Algorithm (SOVA) decoder, or a slicer.

A statistical data calculator 2120 outputs blind-mode output signals ($\hat{z}[k]$) as statistical error data.

A error signal calculator 2140 selects through a switch 2130 any one between the decision-directed mode signal ($\hat{d}[k]$) outputted from the Viterbi decoder 2110 and the blind-mode output signal ($\hat{z}[k]$) obtained in the statistical data calculator 2120 according to the mode, which is the decision-directed mode or the blind mode, and compares the selected signal with the baseband signal (y[k]) outputted from the main filter 2100 to thereby calculate an error signal (e[k]).

An FFF tap coefficient updater 2160 updates the tap coefficient ($b_i[k]$) of the feed forward filter 2101 by using the error signal (e[k]) outputted from the error signal calculator 2140 and the output signal of the equalizer input signal storage 2150.

An FBF tap coefficient updater 2170 updates the tap coefficient ($a_i[k]$) of the feedback filter 2102 by using the decision-directed mode signal ($\hat{d}[k]$ outputted from the Viterbi decoder 2110 and the error signal (e[k]) outputted from the error signal calculator 2140.

The equalizer 905 of the above configuration operates as follows.

The main filter 2100 performs channel equalization onto the baseband signals (x[k]) outputted from the demodulator 904 and outputs a difference between the output of the feed forward filter 2101 and the output of the feedback filter 2102 to the Viterbi decoder 2110, which is a symbol detector.

The main filter 2100 outputs baseband signals (y[k]) from the baseband signals (x[k]) outputted from the demodulator 904 based on the following Equation 7.

$$y[k] = \sum_{i=0}^{N_b-1} b_i[k] \times x[k-i] - \sum_{j=0}^{N_a} a_j[k]\hat{d}[k-j] \qquad \text{Eq. 7}$$

where $N_b$ denotes the number of taps of the feed forward filter 2101; $N_a$ denotes the number of taps of the feedback filter 2102; $a_j[k]$ denotes the tap coefficient of taps of the feedback filter 2102; $b_i[k]$ denotes the tap coefficient of taps of the feed forward filter 2102; and $\hat{d}[k]$ denotes a decision-directed mode signal outputted from the Viterbi decoder 2110.

The equalizer input signal storage 2150 stores the baseband signals (x[k]) outputted from the demodulator 904.

The Viterbi decoder 2110 decodes the baseband signals (y[k]) outputted from the main filter 2100 based on a Viterbi decoding algorithm whose Trace Back Depth (TBD) is 1 to thereby output symbols, which are decision-directed mode signals ($\hat{d}[k]$). The statistical data calculator 2120 outputs blind-mode signals ($\hat{z}[k]$) as statistical error data.

The error signal calculator 2140 selects through the switch 2130 any one between the decision-directed mode signal ($\hat{d}[k]$) outputted from the Viterbi decoder 2110 and the blind-mode output signal ($\hat{z}[k]$) obtained in the statistical data calculator 2120 according to the mode, which is the decision-directed mode or the blind mode, and compares the selected signal with the baseband signal (y[k]) outputted from the main filter 2100 to thereby calculate an error signal (e[k]).

The error signal (e[k]) is calculated based on the following Equation 8.

$$e[k] = \hat{d}[k] - y[k] \qquad \text{Eq. 8}$$

The FFF tap coefficient updater 2160 updates the tap coefficient ($b_i[k]$) of the feed forward filter 2101 by using the error signal (e[k]) outputted from the error signal calculator 2140 and the output signal of the equalizer input signal storage 2150. The FBF tap coefficient updater 2170 updates the tap coefficient of the feedback filter 2102 by using the decision-directed mode signal ($\hat{d}[k]$) outputted from the Viterbi decoder 2110 and the error signal (e[k]) outputted from the error signal calculator 2140.

When the error signal for updating the tap coefficient is the same as the Equation 8, equation for updating the tap coefficients of the feed forward filter 2101 and the feedback filter 2102 is expressed as Equation 9.

$$b_i[k+1] = b_i[k] + \mu e[k] x[k-i]$$

$$b_j[k+1] = a_j[k] - \mu e[k] \hat{d}[k-j] \qquad \text{Eq. 9}$$

Herein, $\mu$ denotes a step size and it is a value determining convergence rate and mean square error (MSE) at a steady state. When the step size ($\mu$) is large, the convergence rate becomes quick but the remaining MSC at the steady state becomes large. On the contrary, when the step size ($\mu$) is small, the remaining MSE becomes small while the convergence rate becomes slow.

The on-channel repeater having an improved capability of removing feedback signals and an on-channel repeating method thereof, which are suggested in the present invention, are suitable for broadcasting systems such as Advanced Television Systems Committee (ATSC), Digital Video Broadcasting (DVB), Digital Multimedia Broadcasting (DMB) and Integrated Services Digital Broadcasting-Terrestrial (ISDB-T) and communication systems such as Wireless Broadband (Wibro) and Code Division Multiple Access (CDMA). However, on-channel repeater and on-channel repeating method of the present invention are not limited to them and they are applicable to any environment requiring repeaters.

The method of the present invention described above may be realized as a program and stored in a computer-readable recording medium, such as CD-ROM, RAM, ROM, floppy disks, hard disks, and magneto-optical disks. Since the process can be easily implemented by those skilled in the art to which the present invention pertains, further description on it will not be provided herein.

While the present invention has been described with respect to the specific embodiments, it will be apparent to those skilled in the art that various changes and modifications may be made without departing from the spirit and scope of the invention as defined in the following claims.

INDUSTRIAL APPLICABILITY

The technology of the present invention can retransmit the same signals as output signals of a main transmitter with a short processing time delay through the repeater, and correct distortion on a reception channel of the repeater before the retransmission, to thereby improve utility efficiency of frequency resources whose quantity is limited.

What is claimed is:
1. An on-channel repeater, comprising:
 a receiver for receiving radio frequency (RF) signals;
 a subtractor for subtracting replica from output signals of the receiver to thereby produce output signals of the subtractor;
 a repeating process unit for performing a repeating process onto the output signals of the subtractor, wherein the repeating process unit includes:

a demodulator for demodulating the output signals of the subtractor;
an equalizer for equalizing the demodulated signals; and
a modulator for modulating the equalized signals;
a replica generator for calculating replica based on the output signals of the subtractor and the signals obtained after repeating process performed thereon and feeding the replica back to the subtractor; and
an identification (ID) signal generating and adding unit for generating ID signals having correlation characteristic, and adding the ID signals to signals obtained in the equalizer after removing noise, multipath signals, and remaining feedback signals that are caused on a transmission path between a main transmitter and the on-channel repeater, wherein the ID signal generating and adding unit adds the ID signals to the signals outputted from the equalizer based on Equation 4, which is expressed as:

$$t(n)=eq(n)+\alpha \cdot v(n) \qquad \text{Eq. 4}$$

where t(n) denotes an output signal of the ID generating and adding unit;
v(n) denotes an ID signal; eq(n) denotes a signal outputted from the equalizer;
and $\alpha$ denotes a constant determining an addition size of the ID signal.

2. The on-channel repeater of claim 1, wherein the repeating process unit includes a demodulator for demodulating the output signals of the subtractor, and
the replica generator further includes a modulator for modulating the demodulated signals.

3. The on-channel repeater of claim 1, wherein the receiver further includes a first down-converter for down-converting the RF signals into signals of a predetermined band;
the repeating process unit further includes an up-converter for up-converting the modulated signals into the RF signals; and
the replica generator further includes a second down-converter for down-converting the RF signals, obtained from the up-conversion, into signals of the predetermined band.

4. The on-channel repeater of claim 3, wherein the predetermined band is baseband.

5. The on-channel repeater of claim 1, wherein the receiver includes a first intermediate frequency (IF) down-converter for down-converting the RF signals into IF signals and a first baseband converter for converting the IF signals obtained from the first down-conversion into baseband signals;
the repeating process unit further includes an up-converter for up-converting the modulated signals into RF signals; and
the replica generator includes a second IF donw-converter for down-converting the RF signals obtained from the up-conversion in the up-converter into the IF signals and a second baseband converter for converting the IF signals obtained from the second down-conversion in the second IF down-converter into the baseband signals.

6. The on-channel repeater of claim 1, wherein the receiver further includes a first analog-to-digital converter for converting the IF signals obtained from the first down-conversion into digital signals;
the repeating process unit further includes a digital-to-analog converter for converting the modulated signals into analog signals; and
the replica generator further includes a second analog-to-digital converter for converting the IF signals obtained from the second down-conversion into digital signals.

7. The on-channel repeater of claim 1, wherein the replica generator includes:
a filter coefficient generator for calculating a filter tap coefficient at a time index n based on a signal without replica at the time index n, a signal onto which a repeating process is performed at the time index n, and a filter tap coefficient at a time index n—1; and
an adaptive filter for calculating the replica based on the filter tap coefficient at the time index n and the signal onto which a repeating process is performed at the time index n.

8. The on-channel repeater of claim 7, wherein the filter coefficient generator calculates the filter tap coefficient vector based on Least Mean Square (LMS) algorithm.

9. The on-channel repeater of claim 7, wherein the filter coefficient generator calculates the filter tap coefficient vector ($\overline{h}_n$) based on Equation 1, which is expressed as:

$$\overline{h_n} = \overline{h_{n-1}} + \lambda \cdot \epsilon(n) \cdot \overline{s_n}^*$$

$$\overline{h_n} = [h_0(n) h_1(n) \ldots h_{K-1}(n)]^T$$

$$\overline{h_{n-1}} = [h_0(n-1) h_1(n-1) \ldots h_{K-1}(n-1)]^T \qquad \text{Eq. 1}$$

where $\overline{s_n}$ denotes a signal vector down-converted into baseband in the down-converter at the time index n; $\epsilon(n)$ denotes a signal vector obtained from subtraction in the subtractor at the time index n; $\lambda$ denotes a constant determining a convergence rate; K denotes the number of filter taps; T denotes a transpose; and * denotes a complex conjugate.

10. The on-channel repeater of claim 9, wherein the adaptive filter calculates the replica (fb(n)) based on Equation 2, which is expressed as:

$$fb(n) = \overline{h_n}^T \cdot \overline{s_n} \qquad \text{Eq. 2}$$

11. The on-channel repeater of claim 10, wherein the subtractor subtracts the replica from the baseband signals obtained from the conversion in the receiver based on Equation 3, which is expressed as:

$$\epsilon(n+1) = r(n) - fb(n) \qquad \text{Eq. 3}$$

where r(n) denotes a baseband signal vector obtained from the conversion in the receiver at the time index n; and $\epsilon(n+1)$ denotes output signals of the subtractor, which are obtained in the subtractor at a time index n+1.

12. The on-channel repeater of claim 1, wherein the demodulator generates carrier frequency offset, and the modulator modulates signals obtained in the equalizer after removing noise, multipath signals, and remaining feedback signals that are caused on a transmission path between the main transmitter and the on-channel repeater, based on the carrier frequency offset.

13. An on-channel repeater of, comprising:
a receiver for receiving radio frequency (RF) signals;
a subtractor for subtracting replica from output signals of the receiver to thereby produce output signals of the subtractor;
a repeating process unit for performing a repeating process onto the output signals of the subtractor, wherein the repeating process unit includes:
a demodulator for demodulating the output signals of the subtractor;
an equalizer for equalizing the demodulated signals; and
a modulator for modulating the equalized signals;
a replica generator for calculating replica based on the output signals of the subtractor and the signals obtained after repeating process performed thereon and feeding the replica back to the subtractor; and an identification (ID) signal generating and adding unit for generating ID signals having correlation characteristic, and adding the ID signals to signals obtained in the equalizer after removing noise, multipath signals, and remaining feedback signals that are caused on a transmission path between a main transmitter and the on-channel repeater, wherein the ID signals have an auto-correlation characteristic ($R_v(\tau)$) of Equation 5, which is expressed as:

$$|R_v(\tau)| = \begin{cases} N, & \tau = 0 \\ \text{small}, & 1 \leq \tau \leq N-1 \end{cases} \qquad \text{Eq. 5}$$

$$R_v(\tau) = \sum_{n=0}^{N-1} v(n) \cdot v(n-\tau)$$

where v(n) denotes an ID signal and N denotes length of the ID signal.

14. The on-channel repeater of claim 13, wherein the replica generator includes:

a filter coefficient generator for calculating a filter tap at a time index n based on a signal without a replica at tha time index n, a signal onto which a repeating process is performed at tha time index n, and a filter tap coefficient at a time index n—1, wherein the filter coefficient generator calculates the filter tap coefficient vector ($\overline{h_n}$) based on Equation 1, which is expressed as:

$$\overline{h_n} = \overline{h_{n-1}} + \lambda \cdot \epsilon(n) \cdot \overline{s_n}^*$$

$$\overline{h_n} = [h_0(n) h_1(n) \ldots h_{K-1}(n)]^T$$

$$\overline{h_{n-1}} = [h_0(n-1) h_1(n-1) \ldots h_{K-1}(n-1)]^T \qquad \text{Eq. 1}$$

where $s_n$ denotes a signal vector down-converted into baseband in the down-converter at the time index n, $\epsilon(n)$ denotes a signal vector obtained from subtraction in the subtractor at the time index n, $\lambda$ denotes a constant determining a convergence rate, K denotes the number of filter taps, T denotes a transpose, and * denotes a complex conjugate; and an adaptive filter for calculating the replica based on the filter tap coefficient at the time index n and the signal onto which a repeating process is performed at the time index n, wherein the adaptive filter calculates the replica (fb(n)) based on Equation 2, which is expressed as:

$$fb(n) = \overline{h_n}^T \cdot \overline{s_n} \qquad \text{Eq. 2}$$

wherein the subtractor subtracts the replica from the baseband signals obtained from the conversion in the receiver based on Equation 3, which is expressed as:

$$\epsilon(n+1) = r(n) - fb(n) \qquad \text{Eq. 3}$$

where r(n) denotes a baseband signal vector obtained from the conversion in the receiver at the time index n, and $\epsilon(n+1)$ denotes output signals of the subtractor, which are obtained in the subtractor at a time index n+1.

15. An on-channel repeater of, comprising:

a receiver for receiving radio frequency (RF) signals;

a subtractor for subtracting replica from output signals of the receiver to thereby produce output signals of the subtractor;

a repeating process unit for performing a repeating process onto the output signals of the subtractor, wherein the repeating process unit includes:

a demodulator for demodulating the output signals of the subtractor;

an equalizer for equalizing the demodulated signals; and a modulator for modulating the equalized signals;

a replica generator for calculating replica based on the output signals of the subtractor and the signals obtained after repeating process performed thereon and feeding the replica back to the subtractor; and an identification (ID) signal generating and adding unit for generating ID signals having correlation characteristic, and adding the ID signals to signals obtained in the equalizer after removing noise, multipath signals, and remaining feedback signals that are caused on a transmission path between a main transmitter and the on-channel repeater, wherein the ID signals have a cross-correlation characteristic ($R_{v,t}(\tau)$) of Equation 6, which is expressed as:

$$|R_{v,t}(\tau)| = \text{small, all } \tau \qquad \text{Eq. 6}$$

$$R_{v,t}(\tau) = \sum_{n=0}^{N-1} v(n) \cdot t(n-\tau)$$

where v(n) and t(n) denotes the ID signals; and N denotes length of the ID signals v(n) and t(n).

16. The on-channel repeater of claim 15, wherein the replica generator includes:

a filter coefficient generator for calculating a filter tap coefficient at a time index n based on a signal without replica at the time index n, a signal onto which a repeating process is performed at the time index n, and a filter tap coefficient at a time index n+1, wherein the filter coefficient generator calculates the filter tap coefficient vector ($\overline{h_n}$) based on Equation 1, which is expressed as:

$$\overline{h_n} = \overline{h_{n-1}} + \lambda \cdot \epsilon(n) \cdot \overline{s_n}^*$$

$$\overline{h_n} = [h_0(n) h_1(n) \ldots h_{K-1}(n)]^T$$

$$\overline{h_{n-1}} = [h_0(n-1) h_1(n-1) \ldots h_{K-1}(n-1)]^T \qquad \text{Eq. 1}$$

where $\overline{s_n}$ denotes a signal vector down-converted into baseband in the down-converter at the time index n, $\epsilon(n)$ denotes a signal vector obtained from subtraction in the subtractor at the time index n, $\lambda$ denotes a constant determining a convergence rate, K denotes the number of filter taps, T denotes a transpose, and * denotes a complex conjugate; and an adaptive filter for calculating the replica based on the filter tap coefficient at the time index n and the signal onto which a repeating process is performed at the time index n, wherein the adaptive filter calculates the replica (fb(n)) based on Equation 2, which is expressed as:

$$fb(n) = \overline{h_n}^T \cdot \overline{s_n} \qquad \text{Eq. 2,}$$

wherein the subtractor subtracts the replica from the baseband signals obtained from the conversion in the receiver based on Equation 3, which is expressed as:

$$\epsilon(n+1) = r(n) - fb(n) \qquad \text{Eq. 3}$$

where r(n) denotes a baseband signal vector obtained from the conversion in the receiver at the time index n, and $\epsilon(n+1)$ denotes output signals of the subtractor, which are obtained in the subtractor at a time index n+1.

17. An on-channel repeater comprising:
a receiver for receiving radio frequency (RF) signals;
a subtractor for subtracting replica from output signals of the receiver to thereby produce output signals of the subtractor;
a repeating process unit for performing a repeating process onto the output signals of the subtractor, wherein the repeating process unit includes:
   a demodulator for demodulating the output signals of the subtractor;
   an equalizer for equalizing the demodulated signals, wherein the equalizer comprises:
      a channel equalizer for executing channel equalization through repeated filtering of the demodulated signals obtained in the demodulator to thereby produce channel-equalized signals;
      an equalizer input signal storage for storing the demodulated signals obtained in the demodulator;
      a symbol extractor for extracting symbols, which are decision data, from the channel-equalized signals;
      a statistical data calculator for calculating statistical error data;
      an error signal calculator for selecting any one between the symbols extracted in the symbol extractor and the statistical error data obtained from the statistical data calculator according to a decision-directed mode or a blind mode, and comparing the selected one with the channel-equalized signals outputted from the channel equalizer to thereby calculate error signals; and
      a tap coefficient updater for updating a tap coefficient applied to the channel equalizer based on the error signals obtained in the error signal calculator, the symbols extracted in the symbol extractor, and signals stored in the equalizer input signal storage; and
   a modulator for modulating the equalized signals; and
a replica generator for calculating replica based on the output signals of the subtractor and the signals obtained after repeating process performed thereon and feeding the replica back to the subtractor.

18. The on-channel repeater of claim 17, wherein the tap coefficient updater includes:
a feed forward filter (FFF) tap coefficient updater for updating a tap coefficient applied to a feed forward filter of the channel equalizer based on the signals stored in the equalizer input signal storage and the error signals obtained in the error signal calculator; and
a feedback filter (FBF) tap coefficient updater for updating a tap coefficient applied to a feedback filter of the channel equalizer based on the symbols extracted in the symbol extractor and the error signals obtained in the error signal calculator.

19. The on-channel repeater of claim 17, wherein the replica generator includes:
a filter coefficient generator for calculating a filter tap coefficient at a time index n based on a signal without replica at the time index n, a signal onto which a repeating process is performed at the time index n, and a filter tap coefficient at a time index n—1, wherein the filter coefficient generator calculates the filter tap coefficient vector ($\overline{h}_n$) based on Equation 1, which is expressed as:

$$\overline{h}_n = \overline{h}_{n-1} + \lambda \cdot \epsilon(n) \cdot \overline{s}_n^*$$

$$\overline{h}_n = [h_0(n) h_1(n) \ldots h_{K-1}(n)]^T$$

$$\overline{h}_{n-1} = [h_0(n-1) h_1(n-1) \ldots h_{K-1}(n-1)]^T \quad \text{Eq. 1}$$

where $\overline{s}_n$ denotes a signal vector down-converted into baseband in the down-converter at the time index n, $\epsilon(n)$ denotes a signal vector obtained from subtraction in the subtractor at the time index n, $\lambda$ denotes a constant determining a convergence rate, K denotes the number of filter taps, T denotes a transpose, and * denotes a complex conjugate; and
an adaptive filter for calculating the replica based on the filter tap coefficient at the time index n and the signal onto which a repeating process is performed at the time index n, wherein the adaptive filter calculates the replica (fb(n)) based on Equation 2, which is expressed as:

$$fb(n) = \overline{h}_n^T \cdot \overline{s}_n \quad \text{Eq. 2,}$$

wherein the subtractor subtracts the replica from the baseband signals obtained from the conversion in the receiver based on Equation 3, which is expressed as:

$$\epsilon(n+1) = r(n) - fb(n) \quad \text{Eq. 3}$$

where r(n) denotes a baseband signal vector obtained from the conversion in the receiver at the time index n, and $\epsilon(n+1)$ denotes output signals of the subtractor, which are obtained in the subtractor at a time index n+1.

\* \* \* \* \*